United States Patent
Suzuki et al.

(10) Patent No.: US 7,422,375 B2
(45) Date of Patent: Sep. 9, 2008

(54) OPTICAL CONNECTION STRUCTURE AND OPTICAL CONNECTION METHOD

(75) Inventors: Masayoshi Suzuki, Shizuoka (JP); Kyoichi Sasaki, Shizuoka (JP); Tatsushi Kobayashi, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 10/579,459

(22) PCT Filed: Nov. 17, 2004

(86) PCT No.: PCT/JP2004/017065

§ 371 (c)(1),
(2), (4) Date: May 16, 2006

(87) PCT Pub. No.: WO2005/050273

PCT Pub. Date: Jun. 2, 2005

(65) Prior Publication Data

US 2007/0086707 A1    Apr. 19, 2007

(30) Foreign Application Priority Data

| Nov. 19, 2003 | (JP) | ............... 2003-388707 |
| Mar. 24, 2004 | (JP) | ............... 2004-086343 |
| Jun. 9, 2004 | (JP) | ............... 2004-170679 |
| Jul. 20, 2004 | (JP) | ............... 2004-211337 |

(51) Int. Cl.
  *G02B 6/38* (2006.01)
(52) U.S. Cl. ............... 385/58; 385/53; 385/55; 385/56; 385/59; 385/60; 385/70; 385/71; 385/72; 385/73; 385/75

(58) Field of Classification Search ............... 385/53, 385/55, 56, 58, 59, 60, 70–73, 75
See application file for complete search history.

(56) References Cited

U.S. PATENT DOCUMENTS

| 5,647,042 A * | 7/1997 | Ochiai et al. ............... 385/56 |
| 6,059,462 A * | 5/2000 | Finak et al. ............... 385/73 |
| 2003/0002548 A1* | 1/2003 | Boscha ............... 372/32 |

FOREIGN PATENT DOCUMENTS

| JP | 55-153912 | 12/1980 |
| JP | 59-101617 | 6/1984 |
| JP | 62-39660 | 2/1987 |
| JP | 01-179106 | 7/1989 |
| JP | 03-175406 | 7/1991 |

(Continued)

*Primary Examiner*—Brian Healy
*Assistant Examiner*—Hung Lam
(74) *Attorney, Agent, or Firm*—Knobbe Martens Olson & Bear LLP

(57) ABSTRACT

The present invention provides an optical connection structure and optical connection method for enabling a connection characterized by a simple structure, ability to retain optical fibers in an adhered state, easy installation and detachment/attachment, and excellent optical stability. The optical connection structure proposed by the present invention has a solid viscous connection member having refractive-index matching property disposed in a single layer state between the end faces of mutually opposing optical transmission media or between the end face of an optical transmission medium and an optical component that are mutually opposing. The solid viscous connection member should desirably be made of silicone resin or acrylic resin.

20 Claims, 26 Drawing Sheets

FOREIGN PATENT DOCUMENTS

| | | |
|---|---|---|
| JP | 05-034532 | 2/1993 |
| JP | 05-157935 | 6/1993 |
| JP | 2000-047071 | 2/2000 |
| JP | 2000-298224 | 10/2000 |
| JP | 2001-124958 * | 5/2001 |
| JP | 2001-324641 | 11/2001 |

* cited by examiner (a)

(b)

(c)

(d)

(e)

(f)

(a)

(b)

(a)

(b)

(c)

(d)

(e)

(a)

(b)

(c)

OPTICAL CONNECTION STRUCTURE AND OPTICAL CONNECTION METHOD

This application is the U.S. National Phase under 35 U.S.C. §371 of International Application PCT/JP2004/017065, filed Nov. 17, 2004, which claims priority to Japanese Patent Application No. 2003-388707, filed Nov. 19, 2003, No. 2004-086343, filed Mar. 24, 2004, No. 2004-170679, filed Jun. 9, 2004, and No. 2004-211337, filed Jul. 20, 2004. The International Application was not published under PCT Article 21(2) in English.

1. Technical Field

The present invention relates to an optical connection structure that connects an optical transmission medium with another optical connection medium or optical component, as well as an optical connection method for forming the same.

2. Background Art

The most common method to connect optical fibers is by means of physical connection, whereby optical fibers or ferrules in which optical fibers are inserted are butted against each other and thereby connected. Examples of connection components that utilize such physical connection include mechanical splices and optical connectors. In general, mechanical splices are effective when components are connected permanently, while optical connectors are effective when connected components are detached and reattached frequently. Both are widely utilized in their respective applications. Both mechanical splices and optical connectors effect physical connection by applying pressure on the end faces of optical fibers in the axial direction. In the case of connection using an optical connector, generally optical fibers are inserted into ferrules for protection when achieving physical contact between the end faces of optical fibers, because optical fibers are brittle and weak.

In such physical connection, the positioning accuracies and end shapes of optical fibers affect the connection characteristics significantly. If the angles of end faces are offset or end faces are rough, for example, air enters between the butted ends of optical fibers and increases Fresnel reflection at connected end faces, which results in increased connection loss.

Various methods to improve this shortcoming have been developed. One proposed method is to finely grind the end faces of optical fibers or both the end faces of optical fibers and ferrules. However, grinding requires a lot of time and cost and is not suitable for general connection applications. Therefore, how to improve the aforementioned problem still remains a great challenge.

Also, methods to connect optical fibers that have been cut but not ground are being examined. One proposed method is to connect optical fibers by applying, on their end faces to be connected, a liquid or grease refractive-index matching agent having a refractive index equal or close to that of the optical fiber core. This method involves application of a refractive-index matching agent on the end faces of optical fiber and then butting the optical fibers, thereby preventing intrusion of air between the connected end faces, avoiding Fresnel reflection caused by air, and ultimately reducing connection loss. However, this method presents a problem because silicone or paraffin-based liquid or grease refractive-index matching agents are used in general, and applying a specified amount of these refractive-index matching agents on the end face of an optical fiber, which provides only a small area, is difficult. If an excessive amount of refractive-index matching agent is applied, the area around the connection point is contaminated and dust and other foreign particles are attached. Also, refractive-index matching agents used in this method generally have high flowability, and therefore they easily flow out of the connection point, which makes it difficult to obtain optical stability. Furthermore, use of a liquid or grease refractive-index matching agent to connect optical fibers in a detachable/reattachable manner necessitates removal of the refractive-index matching agent and its reapplication by a specified amount every time the optical fibers are detached and reattached. This requires considerable time and reduces work efficiency.

On the other hand, methods to use solid refractive-index alignment members are examined. For example, a structure where a clear alignment material film is directly adhered to the end face of each optical fiber without using any adhesive or viscous material layer (Patent Literature 1), as well as structures where a flexible optical-transmitting body or elastic body having a reflective index similar to that of the core is disposed between the connected ends of optical fiber cores (Patent Literatures 2 and 3), are proposed. However, the former structure presents difficulty adjusting the pressure force applied on the optical fiber to adhere the alignment material film, and application of excessive pressure can cause the optical fiber to crack or chip. In the latter structures, the elasticity of the elastic body alone cannot achieve sufficient adhesion, and excessive pressure may be applied as a result. Also, all of the above structures cannot maintain the optical fibers in a connected state. Therefore, the connection point is vulnerable to the effects of mechanical or thermal expansion or contraction of the refractive-index alignment member, which makes it difficult to keep stable connection at all time.

Also, traditional liquid or grease refractive-index matching agents and solid refractive-index alignment members cannot maintain the optical fibers in a connected state. Therefore, the connection point is vulnerable to the effects of mechanical or thermal expansion or contraction, which makes it difficult to keep stable connection at all time. Specifically, because mechanical vibration, expansion or contraction causes the gap between optical fibers to change slightly, use of a liquid or grease refractive-index matching agent can result in the refractive-index matching agent flowing out from the gap. Also, use of a solid refractive-index alignment member presents the possibility of air entering the gap between fibers because the refractive-index alignment member easily separates from the end faces of optical fibers, in which case inclusion of air bubbles may reduce optical characteristics.

A method to attach to the optical-fiber connection point a dielectric film, one side of which is coated with viscous material, is also proposed (Patent Literature 4). This method can increase the adhesion to and retention on one optical fiber due to the viscosity of one side of the dielectric film. However, the adhesion with the other surface is insufficient and the optical fibers may also be damaged for the same reasons mentioned earlier. Additionally, the two-layer structure comprising the viscous material layer and dielectric film causes reflection at the interface of both layers, which causes connection loss. Furthermore, the viscous material layer is thin, and thus the strength of the viscous material layer is low. As a result, scratching results easily due to the edges and burrs around the end faces of butted optical fibers.

As a method to set a member (oxide film) having refractive-index matching property in a manner adhering to an optical transmission medium, a method of irradiating the end face of an optical fiber core with laser beam and forming a thermal oxide film on the optical-output end face by means of laser beam is proposed (Patent Literature 5). In this case, the condition of oxide film changes in accordance with the intensity of laser beam, amount of oxide film material supplied, and temperature of liquid oxide film material. Therefore, adjusting the film to a specified condition is difficult and production efficiency is low. Also, an apparatus to gasify the liquid material and feed the generated gas into a reaction chamber is required, which results in an undesirable increase in equipment cost.

Patent Literature 1: Patent Publication No. 2676705
Patent Literature 2: Publication of Unexamined Patent Application No. 2001-324641
Patent Literature 3: Publication of Unexamined Patent Application No. Hei 05-34532
Patent Literature 4: Publication of Unexamined Patent Application No. Sho 55-153912
Patent Literature 5: Publication of Unexamined Patent Application No. Hei 05-157935

SUMMARY OF THE INVENTION

Problems to be Solved by the Invention

As explained above, current methods that connect optical fibers by butting their end faces under pressure, or those that use refractive-index matching agents, present the problems mentioned above. Various proposals have been made to resolve these problems, but the object of the present invention is to provide an optical connection structure and optical connection method for enabling a connection characterized by a structure simpler than any of those heretofore presented, ability to retain optical fibers in an adhered state, easy installation and detachment/reattachment, and excellent optical stability.

MEANS FOR SOLVING THE PROBLEMS

Through examination, the inventors found that use of a solid viscous connection member could achieve optical connection of an optical transmission medium such as an optical fiber with another optical transmission medium or optical component in a very simple manner, and completed the present invention.

In other words, the optical connection structure proposed by the present invention is characterized by a solid viscous connection member having refractive-index matching property adheringly disposed in a single layer state between the end faces of mutually opposing optical transmission media or between the end face of an optical transmission medium and an optical component that are mutually opposing.

In the present invention, the term "solid viscous connection member" refers to a viscous connection member that does not flow in a static state and retains a specified shape in room temperature.

In the present invention, the thickness of the viscous connection member at the connection point after connection, i.e., the thickness of the viscous connection member disposed between the end faces of mutually opposing optical transmission media or between the end face of an optical transmission medium and an optical component that are mutually opposing should preferably be 50 µm or less. Also, the viscosity retention distance of the above viscous connection member should preferably be 10 µm or more. Furthermore, the above viscous connection member should preferably be made of silicone resin or acrylic resin.

In the present invention, it is preferable that the minimum distance D from the center of the end face of the optical transmission medium contacting the viscous connection member, to the periphery of the viscous connection member, has the following relationship with the radius R of the transmission medium:

$$R < D \leqq 60R$$

Also, the viscous connection member may have its periphery supported by a supporting member.

In a specific embodiment of the optical connection structure proposed by the present invention, the optical connection structure has a solid viscous connection member comprising a single layer having refractive-index matching property sandwiched between mutually opposing optical transmission media having each a core or between an optical transmission medium having a core and an optical component that are mutually opposing, and if the minimum distance and maximum distance from the center of the core of the optical transmission medium to the periphery of the viscous connection member are given by $D_1$ and $D_2$, respectively, radius of the optical transmission medium by R, and radius of the core of the optical transmission medium by r, the relationships of $D_1 \geqq r$ and $D_2 \leqq 1.5R$ are satisfied.

In another specific embodiment of the optical connection structure proposed by the present invention, the optical connection structure has a pair of ferrules each having at least one optical-fiber alignment hole in which an optical fiber is affixed, or a pair of plugs containing the ferrules, butted against each other and thus optically connected in the optical-fiber alignment hole in a manner sandwiching a solid viscous connection member having refractive-index matching property, where such viscous connection member is a sheet-shaped viscous material comprising a single layer.

In this case, the structure may have a member for positioning the ferrules or plugs. Also, such positioning member may be a split sleeve and the ferrules or plugs may be butted against each other inside the split sleeve in a manner sandwiching the viscous connection member in between.

In the aforementioned optical connection structure, the positioning member may be a guide pin and the ferrules or plugs, each having a guide pin hole, may be positioned in such a way that the guide pin is inserted into the facing guide pin holes.

In the above optical connection structure conforming to the present invention, the ferrules or plugs may be installed in an adapter, and the solid viscous connection member may be retained inside the adapter to allow the ferrules or plugs to be butted against each other inside the adapter in a manner sandwiching the viscous connection member in between. In this case, the viscous connection member may be retained in the adapter independently or in a manner supported by a supporting member.

In the above optical connection structure conforming to the present invention, the viscous connection member may be supported by a supporting member, and the supporting member that supports the viscous connection member may be installed in a split sleeve. Also, the supporting member that supports the viscous connection member may comprise a tubular member, with the viscous connection member supported on one end of the tubular member and the other end of the tubular member engaging with the ferrule or adapter.

In yet another specific embodiment of the optical connection structure proposed by the present invention, the optical connection structure has at least one pair of optical transmission media, an alignment member with an alignment groove, a solid viscous connection member having refractive-index matching property and able to freely change its shape, and a supporting member that supports the viscous connection member; wherein the end faces of at least one pair of optical transmission media are opposingly placed inside the alignment groove in the alignment member, and the supporting member is placed above the alignment groove between the optical transmission media to achieve optical connection of at least one pair of optical transmission media in a manner sandwiching the viscous connection member in between.

In the aforementioned optical connection structure, the alignment member may have a groove for placing the support member, extending in the direction crossing with the alignment groove. Also in the aforementioned optical connection structure, the supporting member may have at least one projection, and the alignment member may have at least one hole. In this case, the projection of the supporting member can be inserted into the hole in the alignment member so that the supporting member can be securely placed above the alignment groove.

The first embodiment of the optical connection method proposed by the present invention is a method for connecting the end faces of optical transmission media or the end face of an optical transmission medium and an optical component using the optical transmission media, or optical transmission medium and optical component, and a sheet-shaped viscous connection member having refractive-index matching property; wherein the method comprises: a step of placing the sheet-shaped viscous connection member between the end faces of mutually opposing optical transmission media or between the end face of an optical transmission medium and an optical component that are mutually opposing; a step of moving the end face of one optical transmission medium until it adheres to the sheet-shaped viscous connection member; and a step of moving the end face of this optical transmission medium further until the sheet-shaped viscous connection member deforms and adheres to the other optical transmission medium or optical component.

The second embodiment of the optical connection method proposed by the present invention is a method comprising: a step of moving a sheet-shaped viscous connection member relative to an optical transmission medium in the axial direction of the optical transmission medium while the end face of the optical transmission medium is pressed and adhered against the sheet-shaped viscous connection member, in order to separate a part of the sheet-shaped viscous connection member while it is still attached to the end face; and a step of joining the optical transmission medium with a solid viscous connection member attached to its end face with another optical transmission medium or optical component. In this case, the sheet-shaped viscous connection member may be supported by an end-face treatment member. Also, the end-face treatment member may have a through hole into which an optical transmission medium is inserted, and the sheet-shaped viscous connection member may be attached to one end of the end-face treatment member in a manner blocking the through hole.

The above optical connection method is explained in greater detail by using an example where an optical fiber whose end has been stripped and cut is used as an optical transmission medium. First, the optical fiber is moved relative to the sheet-shaped viscous connection member until the end face of the optical fiber adheres to the sheet-shaped viscous connection member. Next, the optical fiber is further moved in the axial direction to cause a part of the sheet-shaped viscous connection member to be separated while it is still attached to the end face of the optical fiber, thereby attaching the viscous connection member to the end face of the optical fiber and thus treating the end face of the optical fiber. In this method, the viscous connection member can be easily attached to the end face of the optical fiber only by moving the optical fiber, and there is no need to use any complex apparatus or expensive equipment. Next, the optical fiber whose end has been treated is butted against and thus optically connected with another optical fiber or other optical component to produce an optical connection structure conforming to the present invention.

In this specification, "a sheet-shaped viscous connection member is moved relative to an optical transmission medium in the axial direction of the optical transmission medium" refers to moving either the viscous connection member or optical fiber. Also, any moving speed and distance can be selected as deemed appropriate.

The third embodiment of the optical connection method proposed by the present invention is an optical connection method that forms an optical connection structure using at least one pair of optical transmission media, an alignment member with an alignment groove, a solid viscous connection member having refractive-index matching property and able to freely change its shape, and a supporting member that supports the viscous connection member; wherein the method comprises: a step of opposingly placing the end faces of at least one pair of optical transmission media inside the alignment groove in the alignment member; a step of placing the supporting member, which supports the solid viscous connection member that can freely change its shape, above the alignment groove between the opposing optical transmission media; and a step of butting the opposing optical transmission media against each other in a manner sandwiching the viscous connection member in between.

First, the optical connection structure proposed by the present invention is explained. Optical transmission media used under the present invention include optical wave guides in addition to optical fibers as mentioned above. The types of optical wave guides are not limited in particular and any optical wave guides can be used as long as they transmit light. The types of optical fibers are not at all limited, either, and any optical fibers can be used as deemed appropriate for a given application. For example, optical fibers made of quartz or plastics can be used, and holey fibers can also be utilized. As for optical wave guides, polyimide optical wave guides, PMMA optical wave guides and epoxy optical wave guides can be utilized, among others. Also, two optical transmission media of different types can be connected stably because they can be adhered by means of wettability of the solid viscous connection member. Furthermore, the present invention can be applied to optical transmission media of different outer diameters, as long as they have the same core diameter. The number of optical fibers or optical wave guides is not at all limited, and optical fiber tapes comprising multiple optical fibers can also be used.

In the present invention, optical components that are optically connected with optical transmission media include optical lenses and filters, and their types are not limited in particular. Examples of optical lenses include those having various shapes such as convex on both sides, concave on both sides, concave/convex, flat/convex, and aspherical, as well as collimator lenses and rod lenses. Examples of filters include general filters used for optical communications, as well as multi-layer membrane filters and polyimide filters.

Solid viscous connection members acceptable under the present invention are members that, upon contact with an optical transmission medium or optical component, adhere to the end face of the optical transmission medium or optical component with an appropriate tackiness. Viscous materials that are detachable/reattachable between optical transmission media, do not undergo cohesive failure, and do not attach to the optical transmission medium after separated from the medium, are preferred. Specifically, various viscous materials such as acrylic, epoxy, vinyl, silicone, rubber, urethane, methacryl, nylon, bisphnol, diol, polyimide, fluorinated epoxy and fluorinated acrylic materials can be used. Of these, viscous silicone and acrylic materials are particularly favorable in view of their environmental resistance, adhesive strength and other properties. Some of these materials have a porous structure, but air can be eliminated by means of compressing the viscous connection member by applying an appropriate level of pressure on the viscous connection member at the time of connection, in order to prevent optical transmission loss.

Viscous silicone materials used under the present invention are viscous materials having their main chain structure constituted by Si—O—Si bond (siloxane bond), and are made of silicone rubber or silicone resin. They are dissolved in organic solvent and applied in liquid form to be solidified or made into film. The main polymer of silicone rubber is straight-chain polydimethyl siloxane, including any structure where the methyl groups are partially replaced by phenyl groups or vinyl groups. As for silicone resin, compositions having a complex three-dimensional structure and molecular weight of approx. 3,000 to 10,000 are used and function as resin to add adhesiveness in viscous rubber materials. Viscous silicone materials can be blended with crosslinking agents, softeners, viscosity controlling agents and other additives to adjust adhesive strength or wettability or add water resistance or heat resistance.

Viscous silicone materials have excellent heat reserving property and exhibit excellent adhesive strength in either a high or low-temperature environment. Therefore, an optical connection structure having viscous silicone material between two optical transmission media or between an optical transmission medium and an optical component can maintain adhesion at the connection point in a high-temperature environment (up to 250° C.) or low-temperature environment (down to −50° C.), and thus can keep a stable connection state. Also, viscous silicone materials do not harden or become yellow after having been exposed to high temperatures, and can be easily separated from the adherend. Also, viscous silicone materials offer excellent electrical insulation property, chemical resistance, weather resistance and water resistance, and can adhere to various materials such as plastic optical fibers made of fluorinated resins and optical fibers and other components whose clad layer is coated with fluorinated resins. Viscous silicone materials also exhibit viscosity on optical wave guides and optical components based on fluorinated polyimide and other fluorinated resins, which makes viscous silicone materials all the more useful.

Viscous acrylic materials used under the present invention are polymers whose basic structure is acrylic acid alkyl ester with a carbon number of 2 to 12 or methacrylic acid alkyl ester with a carbon number of 4 to 12 as the main monomer. Specific examples are ethyl acrylate, n-butyl acrylate, isobutyl acrylate, 2-ethyl hexyl acrylate, lauryl acrylate, benzil acrylate and other acrylic acid alkyl esters; and n-butyl methacrylate, isobutyl methacrylate, 2-ethyl hexyl methacrylate, lauryl methacrylate, benzil methacrylate and other methacrylic acid alkyl esters. Monomers that can be copolymerized with these main monomers include methyl acrylate, methyl methacrylate, ethyl methacrylate, propyl methacrylate, vinyl acetate, acrylonitrile, methacrylonitrile, acryl amide and styrene.

Also, viscous acrylic materials can have a crosslink structure to add the cohesive power necessary to achieve adhesion with optical transmission media. This can be done via copolymerization of a small amount of monomers having functional groups such as acrylic acid, hydroxy ethyl methacrylate or glycidyl methacrylate. By adjusting the composition and blending ratio of these, viscosity, cohesiveness, tackiness and other properties can be easily changed. Specific examples of monomers having functional groups include: monomers containing carboxyl groups such as monocarboxylic acid, e.g. acrylic acid, methacrylic acid, etc., polycarboxylic acid, e.g. maleic acid, fumaric acid, citraconic acid, glutaconic acid, itaconic acid, and their acid anhydrides etc.; monomers containing hydroxyl groups such as 2-hydroxy propyl(meth)acrylate, 3-chrolo-2-hydroxy propyl(meth)acrylate, diethylene glycol mono(meth)acrylate, N-methylol acryl amide, N-methylol methacryl amide, etc. and monomers containing amino groups such as dimethyl amino ethyl methacrylate, t-butyl amino ethyl methacrylate, acryl amide, etc.

Viscous acrylic materials include emulsion-type viscous materials that use water during production, and solvent-type viscous materials that use organic solvents. In the present invention, use of solvent-type viscous materials is preferable. It is because solvent-type viscous materials offer excellent water resistance and create clear viscous material film. For instance, solvent-type viscous materials can be synthesized by means of radical polymerization of monomers in an organic solvent such as toluene, xylene or other aromatic hydrocarbon, ethyl acetate, butyl acetate or other ester, or methyl ethyl ketone, methyl isobutyl ketone, cyclohexane or other ketone, or by means of emulsion polymerization of water dispersions of monomers in the presence of an emulsifier.

It is important that optical connection components allow light to transmit through their connection point, and therefore viscous acrylic materials must have good transparency and their light transmittance in the applicable wavelength, or the range of visible light or near infrared range, should preferably be 85% or above. Viscous acrylic materials can achieve transparency relatively easily through adjustment using crosslinking agents and hardeners. Materials whose light transmittance in the applicable wavelength is 90% or above can be used more preferably.

In addition to adhering favorably to glass, plastic, etc., viscous acrylic materials also exhibit excellent water resistance and chemical resistance. In an optical connection structure where viscous acrylic material is disposed between two optical transmission media or between an optical transmission medium and an optical component, the adhesion at the contact point can be retained and a stable connected state can be maintained. In addition, viscous acrylic materials demonstrate excellent adhesive strength in a temperature range of 0 to 80° C., so they can be used in an environment of normal outside air temperatures without problem. They also have excellent weather resistance and do not easily undergo UV deterioration that often occurs with viscous rubber materials. Therefore, they do not harden or become yellow during use and can be separated easily from the adherend. Affordability of these materials is another advantage.

Solid viscous connection members used in the present invention may be sheet-shaped viscous connection members made of film constituted by any of the above viscous materials, or materials that do not flow and can retain a specified shape in a static state but whose shape changes freely. Under the present invention, if the solid viscous connection member is a sheet-shaped viscous connection member, then the shape of the connection member is not limited in particular and any shape can be selected as deemed appropriate in accordance with the surrounding environment or specification of the connection point. For example, the connection member may have a circular, oval, square or triangular shape. The size of the sheet-shaped viscous connection member is explained later.

Solid viscous connection members used under the present invention must have refractive-index matching property between optical transmission media or between an optical transmission medium and an optical component. Here, "refractive-index matching property" refers to the degree of closeness between the refractive index of the viscous connection member and the refractive index of the optical transmission medium or optical component. The refractive index of any viscous connection member used under the present invention is not limited in particular, as long as it is close to the refractive index of the applicable optical transmission medium or optical component. However, the differential refractive index should be preferably within ±0.1, or more preferably within ±0.05, in order to prevent transmission loss by avoiding Fresnel reflection. If the differential refractive index between the optical transmission medium and optical component is large, it is preferable that the average refractive index of the optical transmission medium and optical component and the refractive index of the viscous connection member be within the above ranges.

As for optical connection components used under the present invention, the thickness of the viscous connection member disposed between the end faces of optical transmission media or between the end face of an optical transmission medium and an optical component should be preferably 50 µm or less, or more preferably 20 µm or less, although the specific thickness depends on the pressure applied at the time of butting. If the thickness after butting is greater than 50 µm, the gap between the butted optical transmission media becomes too large and optical transmission losses increase, in which case the connection structure may not be suitable for optical transmission applications. The same applies to connection between an optical transmission medium and an optical component.

The viscous connection member should be replaced only as deemed appropriate when, for example, dust is attached to the surface. Alternatively, to prevent foreign matter from entering before replacement, protective film may be attached to one side or both sides of the viscous connection member in advance. By the way, pressing and rubbing the tip of an optical transmission medium against a viscous connection member several times to transfer the dust attached on the tip of the optical transmission medium to the viscous material, and then replacing the viscous connection member, has the effect of cleaning the optical transmission medium.

Effects of the Invention

In the optical connection structure proposed by the present invention, the solid viscous connection member has a single-layer structure. Therefore, the overall structure is simple and does not cause reflection of light. Also, the viscous connection member does not allow the refractive-index matching agent to enter the cavity in a holey fiber, which often occurs when the refractive-index matching agent is liquid, and thus this structure has no negative effects at all on the optical fiber transmission characteristics. Since the viscous connection member is solid, it does not cause contamination by flowing out into the area around the connection point. This prevents attachment of dust and improves the ease of handling. Moreover, the viscous connection member can be adhered only to the end face of an optical transmission medium, which means the surroundings are not contaminated while the connection point is not contaminated by the surroundings, either. Furthermore, the solid viscous connection member attaches to the end face of an optical transmission media by means of contact, and thus there is no need to provide a separate, special supporting means or structure to retain the viscous connection member. As a result, the viscous connection member can be supported by a simple supporting member, which contributes to space saving. Being solid, the viscous connection member can also freely change its shape in between the media, which prevents air from entering the space between the ends of optical transmission media and permits connection of low optical transmission loss without having to add a grinding process. Additionally, the restoration property of the viscous connection member permits optical connection to be made several times repeatedly.

If the solid viscous connection member has a sheet shape, the gap between the end faces of optical fibers can be uniformly reduced, and thus optical transmission loss can be reduced. Since the sheet-shaped member extends in the axial direction of the optical transmission medium as its shape changes from flat to wavy, the optical transmission medium does not receive excessive pressure easily and thus does not break. Furthermore, multi-core optical fiber tapes can be connected easily. Specifically, because the viscous connection member deforms differently relative to each of the multiple optical fibers in accordance with the butting condition of each fiber, the optical fibers do not damage even when they project by different lengths, which in turn results in stable optical connection. When a lens or filter is connected with an optical fiber, the two can be adhered over the minimum area, which allows the viscous connection member to be separated easily and thus improves workability. If the viscous connection member is supported by a supporting member, the viscous connection member can be easily replaced simply by moving the supporting member when the viscous connection member is detached and reattached, and this significantly improves workability.

Under the optical connection method proposed by the present invention, the viscous connection member can be adhered easily to the end face of an optical fiber simply by moving the optical fiber relative to the viscous connection member. As a result, no complex apparatus or expensive equipment is required, and the environmental conditions during production need not be set strictly.

BRIEF DESCRIPTION OF THE DRAWINGS

FIG. 22(a) is a plan view of a supporting member supporting a sheet-shaped viscous connection member, while FIG. 22(b) is a perspective view explaining the condition of how the supporting member in FIG. 22(a) is installed in a split sleeve.

FIG. 37(a) is a side view while FIG. 37(b) is a section view of B-B.

FIG. 40(a) is a drawing showing optical connector components, while FIG. 40(b) is a drawing showing a connected state of these components.

DESCRIPTION OF THE SYMBOLS

Figure 1:
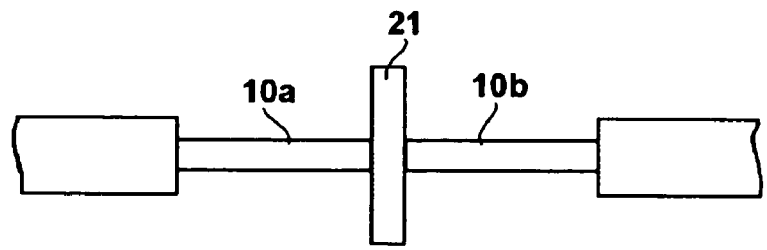
FIG. 1 is a plan view showing a basic example of the optical connection structure proposed by the present invention.

10(a, b)—Optical fiber, 11—Optical fiber (core) center, 12—Clad, 13—Core, 15(a, b)—Optical fiber tape, 17—Rod lens, 19—Optical lens, 20—Viscous connection member, 21—Sheet-shaped viscous connection member, 25—Viscous connection member, 31, 32, 34—Supporting member, 40, 41, 42, 43, 44, 45, 46—Alignment member (connection alignment member), 47(a, b)—Guide pin, 49—Split sleeve, 50—Adapter, 51 —MPO adapter, 61, 62—End-face treatment member, 71(a, b)—MPO connector plug, 72—FC connector plug, 75(a, b)—MT ferrule, 76—FC connector ferrule, 80—Board (glass board).

Best Mode for Carrying Out the Invention

Next, the optical connection structure and optical connection method proposed by the present invention are explained by referring to the drawings. First, a case in which the solid viscous connection member is a sheet-shaped viscous connection member is explained using FIGS. 1 through 23.

FIG. 1 is a plan view showing a basic example of the optical connection structure proposed by the present invention, in which a sheet-shaped viscous connection member is used along with optical fibers as optical transmission media. In FIG. 1, a sheet-shaped viscous connection member 21 is adheringly disposed between the connected end faces of an optical fiber 10a and another optical fiber 10b. The two optical fibers 10a, 10b are butted against each other via the sheet-shaped viscous connection member 21, and they together form a connection structure in which the optical fibers are optically connected. The two optical fibers 10a, 10b have been stripped by several tens of millimeters from the tips and the stripped tips have been cut.

The thickness t of the sheet-shaped viscous connection member before the end faces of optical transmission media, or the end face of an optical transmission medium and an optical component, are optically connected should preferably be in a range of 1 $\mu m \leqq t \leqq 150$ $\mu m$. If the thickness of the viscous connection member becomes smaller than 1 $\mu m$, handling becomes very difficult and the flexibility cannot be maintained, and therefore butting of an optical transmission medium or optical component can cause damage to the optical transmission medium or optical component. If the thickness is greater than 150 $\mu m$, on the other hand, deforming the viscous connection member by means of butting optical transmission media or an optical transmission medium and an optical component creates too large a gap between the end faces of optical transmission media or between the optical transmission medium and optical component, and thus optical transmission loss increase. A more preferable thickness range is 2.5 $\mu m \leqq t \leqq 100$ $\mu m$. However, 5 $\mu m \leqq t \leqq 50$ $\mu m$ is even better, and 5 $\mu m \leqq t \leqq 30$ $\mu m$ is the best.

The sheet-shaped viscous connection member used in the present invention comprises a single layer. In the present invention, "single layer" means that the sheet-shaped viscous connection member does not have any interface connecting different types of materials as is the case in a double-layer or triple-layer structure, and does not preclude structures in which different materials are uniformly mixed on the order of light wavelength. The sheet-shaped viscous connection member used in the present invention has a very simple structure comprising a single layer having viscosity as explained above. By using this single-layer, sheet-shaped viscous connection member, connection can be achieved by avoiding reflection of light and thus minimizing optical transmission loss. Also, the sheet-shaped viscous connection member is not at all affected by burrs along the end face of an optical fiber. Since the surface of the sheet-shaped viscous connection member exhibits wettability, it can also be easily attached between the end faces of two butted optical fibers, and kept securely adhered to the optical fibers by means of its adhesive strength. Since the sheet-shaped viscous connection member also has refractive-index matching property, it can achieve favorable optical connection. Furthermore, the sheet-shaped viscous connection member exhibits wettability and adhesive strength on its surface and thus there is no need to apply excessive pressure when optical fibers are butted against each other. This prevents breaking or chipping of optical fibers. In addition, the sheet-shaped viscous connection member has removability like other viscous materials, so it can be used repeatedly over several detachments/reattachments.

Figure 2:
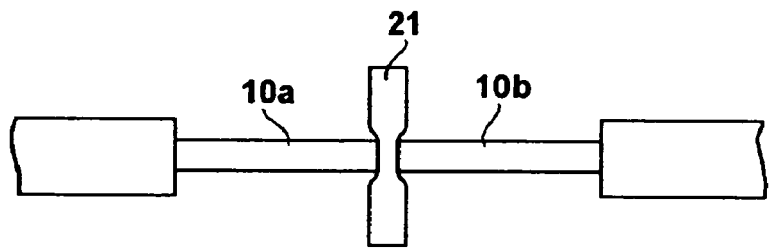
FIG. 2 is a plan view showing an example of the optical connection structure proposed by the present invention.

FIG. 2 is a plan view showing another example of the optical connection structure proposed by the present invention, in which a sheet-shaped viscous connection member is used. The connected end faces of an optical fiber 10a and another optical fiber 10b are butted against each other via a flexible sheet-shaped viscous connection member 21, and the sheet-shaped viscous connection member 21 is deformed as a result. As described above, the flexible sheet-shaped viscous connection member 21 can, even when it is relatively thick, keep the two optical fibers in close proximity to each other by deforming between the two optical fibers. Therefore, the sheet-shaped viscous connection member can be set to have a sufficient thickness, which makes it very easy to handle the connection member. Also, even when the angles of the end faces of two butted optical fibers are offset or their shapes are deformed, the sheet-shaped viscous connection member deforms while still adhered to the end faces of optical fibers. Therefore, air does not easily enter the space between the ends of optical fibers and thus optical connection can be achieved at a minimal loss without using high-precision grinding technology. In addition, the adhesive strength of the sheet-shaped viscous connection member permits optical fibers to be connected stably even when the optical fibers undergo shape change due to the effect of vibration or heat. Furthermore, the sheet-shaped viscous connection member has surface flexibility and thus the end faces of optical fibers are not damaged when the optical fibers are butted against each other, which ensures great ease of handling during optical connection. Moreover, the flexibility of the sheet-shaped viscous connection member allows the member to restore its original condition. Therefore, the sheet-shaped viscous connection member can be used multiple times over repeated detachments/reattachments from/to the optical connection structure comprising optical fibers.

Figure 3:
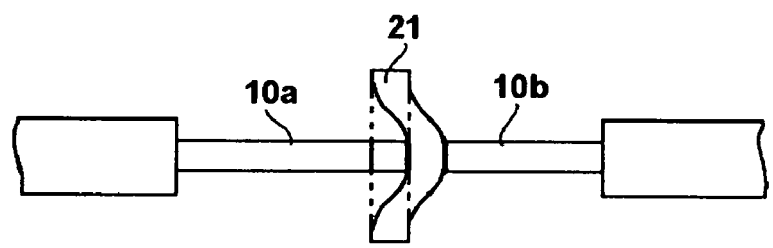
FIG. 3 is a plan view showing another example of the optical connection structure proposed by the present invention.

FIG. 3 is a plan view showing another example of the optical connection structure proposed by the present invention, in which a flexible sheet-shaped viscous connection member is used. In this figure, both ends of a sheet-shaped viscous connection member 21 are affixed in position by other components not shown. This optical connection structure is formed in the following manner. First, optical fibers 10a, 10b whose ends have been stripped and cut, and a sheet-shaped viscous connection member 21, are placed with a certain interval provided in between, after which one optical fiber 10a is moved until its end face adheres to the sheet-shaped viscous connection member, and then moved further, while deforming the sheet-shaped viscous connection member, until it adheres to the other optical fiber 10b. This way, an optical connection structure in which the optical fibers 10a, 10b are optically connected is formed by a mechanical means. In this case, as the sheet-shaped viscous connection member 21 deforms the positions of the end faces of butted optical fibers change relative to the positions of the end faces of the sheet-shaped viscous connection member before butting. The sheet-shaped viscous connection member 21 deforms from a flat plate to wavy shape as shown in FIG. 3.

In the above case, the sheet-shaped viscous connection member deforms as it expands in the axial direction of the optical fiber. Therefore, the optical fibers do not receive excessive pressure and consequently optical fiber damage can be prevented. Also, the mechanism of affixing one optical fiber and then moving the other optical fiber in the manner explained above eliminates the need for positioning the optical fibers with high precision, which enables a more reliable optical connection structure to be formed in a practical manner. Also, if the connection of optical fibers is released, the flexible sheet-shaped viscous connection member returns to its original shape and the same sheet-shaped viscous connection member can be used again. As long as a certain gap or space is provided around the end face of each optical fiber to be connected, the sheet-shaped viscous connection member can deform from a flat to wavy shape while flexibly expanding. This allows the optical fibers to be detached and reattached repeatedly. In this case, "deform" means that the sheet-shaped viscous connection member changes its shape while expanding itself However, compressive deformation resulting in a concave shape, as shown in FIG. 2, is also permitted.

Figure 4:
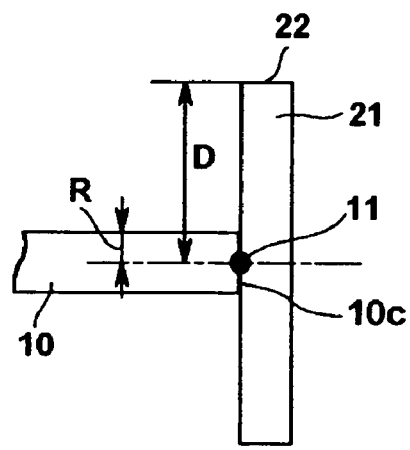
FIG. 4 is a plan view of the attachment section of an optical fiber and a sheet-shaped viscous connection member in the optical connection structure proposed by the present invention, as seen from the direction perpendicular to the axis of the optical fiber.

FIG. 4 is a plan view of the connection point of an optical fiber 10 and a sheet-shaped viscous connection member 21 in the optical connection structure proposed by the present invention, as seen from the direction perpendicular to the axis of the optical fiber. In FIG. 4, D indicates the minimum distance from the center of the end face 10c of the optical transmission medium (optical fiber 10) contacting the sheet-shaped viscous connection member 21, to the periphery 22 of the sheet-shaped viscous connection member, while R indicates the radius of the optical transmission medium. For the sheet-shaped viscous connection member to deform in the manner described above, the values of D and R should ideally satisfy the relationship of $R<D\leqq 60R$.

FIGS. 5(a) through (e) are plan views explaining the values of D relative to sheet-shaped viscous connection members 21 of various shapes, as seen from the axial direction of the optical fiber. FIG. 5(f) is a plan view explaining a condition where a viscous connection member is provided only on the end face of an optical fiber as explained later. In FIGS. 5(a) through (e), numeral 10a indicates the end face of the optical transmission medium (optical fiber 10) contacting the sheet-shaped viscous connection member 21, 11 indicates the center of this end face, and 22 indicates the periphery of the sheet-shaped viscous connection member 21. If a multi-core optical transmission medium is used as shown in FIG. 5(e), D represents the minimum distance from the point at which the end faces of adjacent optical transmission media contact the connection member, to the optical fiber center. If the sheet-shaped viscous connection member is supported by a supporting member as described later or affixed by some kind of affixing member, the value of D gives the minimum distance between the periphery, excluding the points contacted by the supporting member or affixing member, and the optical fiber center.

If a certain space is provided around the sheet-shaped viscous connection member, as shown in FIGS. 5(a) through (e), the sheet-shaped viscous connection member retains degrees of freedom even while adhering to the optical fibers, and thus can change its shape flexibly. If the value of D is greater than 60R, the deformation of the sheet-shaped viscous connection member increases due to the projection of optical fibers, and floppiness and wrinkling occur over the entire member. Since this can cause the sheet-shaped viscous connection member to break, stable connection cannot be achieved. Also, the restoration property of the sheet-shaped viscous connection member decreases after the optical fibers are removed, and thus the sheet-shaped viscous connection member cannot be reused. If D and R are equal, while the sheet-shaped viscous connection member adheres to the butted optical fibers, it becomes impossible to deform the sheet-shaped viscous connection member to a wavy shape. If D is smaller than R, the sheet-shaped viscous connection member does not adhere over the entire surface of the optical fiber and thus the area contacting air increases optical transmission loss. A more preferable range of D is $2R\leqq D\leqq 30R$. If the optical transmission medium is not a cylinder as in the case of an optical fiber, but a prism as in the case of a wave guide, the value of R should be a half of the diagonal line of the rectangle forming the cross-section of the wave guide.

Figure 6:
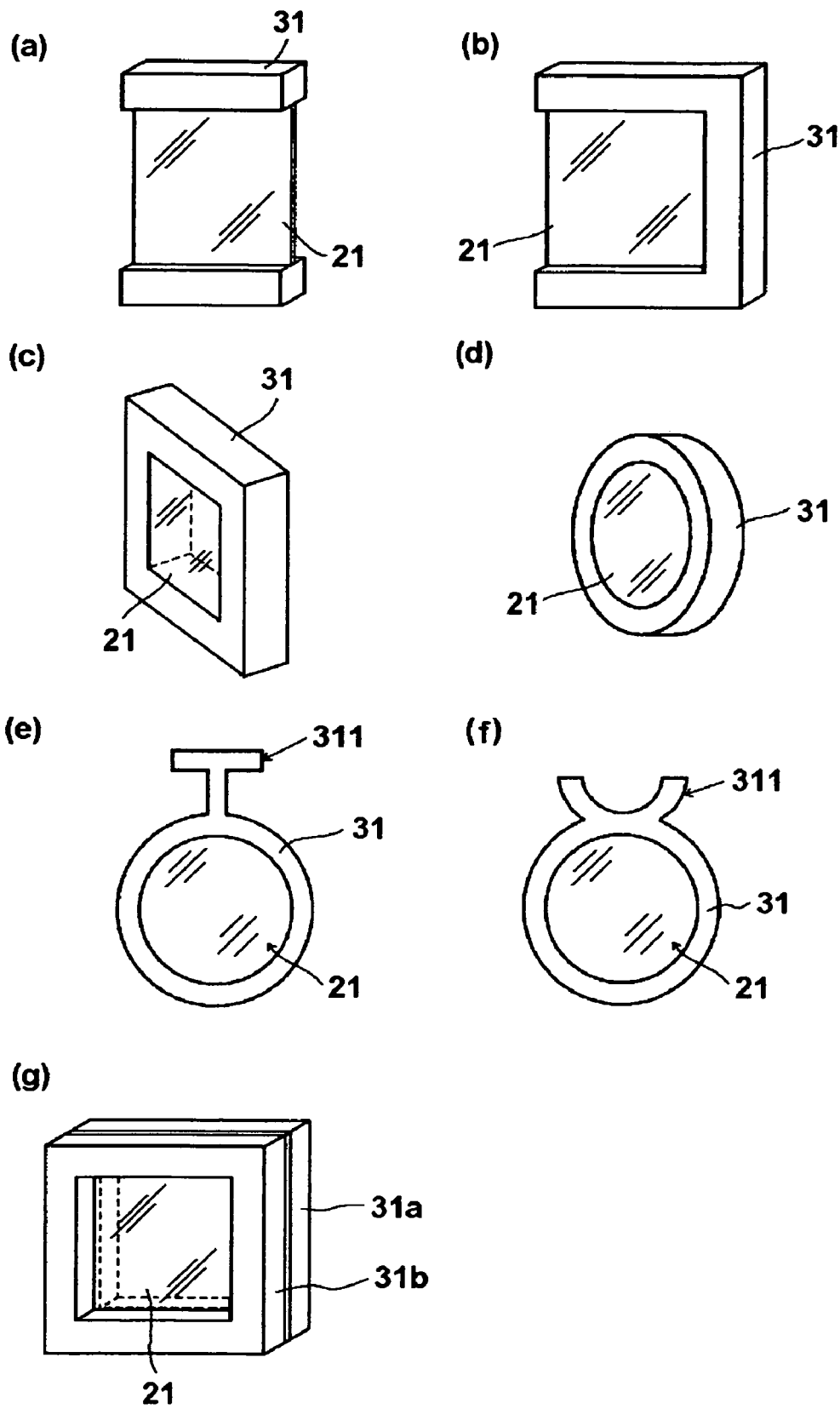
FIG. 6 provides perspective or plan views showing viscous connection members used in the optical connection structure proposed by the present invention, which are supported by various supporting members along their periphery.

In the present invention, the means for affixing the sheet-shaped viscous connection member is not limited in particular. In the case of the optical connection structures shown in FIG. 1 or 3, however, it is desirable that the sheet-shaped viscous connection member remain affixed at all time during use. For example, use of the supporting member described below is preferable. FIG. 6 provides perspective views (FIGS. 6(a) through (d) and (g)) or plan views (FIGS. 6(e) and (f)) showing sheet-shaped viscous connection members used in the optical connection structure proposed by the present invention, which are supported by various supporting members along their periphery. A supporting member 31 only needs to hold the sheet-shaped viscous connection member 21 and affix at least both ends of the sheet-shaped viscous connection member, and can have a simple shape for holding both ends of the sheet-shaped viscous connection member as shown in FIG. 6(a), or a reverse-C shape for affixing the three sides of the sheet-shaped viscous connection member as shown in FIG. 6(b). However, a window shape for holding the top, bottom, right and left of the sheet-shaped viscous connection member in a stable manner, as shown in FIGS. 6(c) through (g), is more preferable. Also, a holding part 311 can be provided to make it easier to hold the supporting member, as shown in FIGS. 6(e) and (f). If the supporting member has such a holding part in an optical connection structure having a split sleeve as described later, which also conforms to the present invention, the holding part can be held as the supporting member is inserted into the split sleeve until near the center.

Furthermore, the number of members comprising the supporting member is not limited, and a structure where two supporting members 31a, 31b are used to stably sandwich the sheet-shaped viscous connection member, as shown in FIG. 6(g), is permitted. The size of the supporting member is not limited in particular, and any size can be selected as deemed appropriate in accordance with the use environment and specification. The material of the supporting member may be selected as deemed appropriate from among metals, plastics, rubbers, and the like. By affixing the sheet-shaped viscous connection member using a supporting member or members, the sheet-shaped viscous connection member can deform flexibly. If the sheet-shaped viscous connection member is affixed using a frame-shaped supporting member, the sheet-shaped viscous connection member can be handled without having to touch the sheet-shaped viscous connection member during the installation process, which prevents attachment of contaminants, dust, etc., to the surface of the sheet-shaped viscous connection member. This also facilitates easy replacement of the sheet-shaped viscous connection member.

Figure 7:
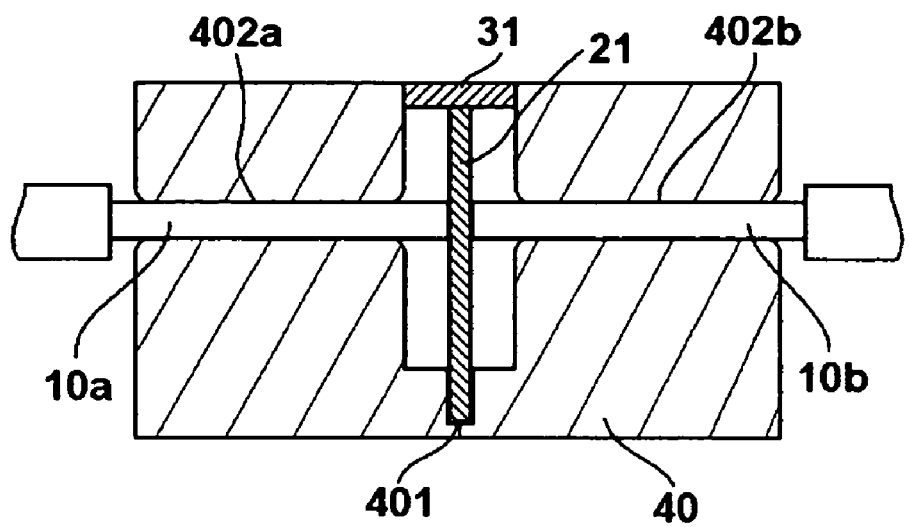
FIG. 7 is a side section view showing an example of the optical connection structure proposed by the present invention, in which a connection alignment member is used.

FIG. 7 is a side section view showing an example of the optical connection structure proposed by the present invention, in which a connection alignment member is used as a positioning member. This configuration comprises two optical fibers 10a, 10b, a connection alignment member 40, and a sheet-shaped viscous connection member 21 supported by a supporting member 31. The connection alignment member 40 has a groove 401 at the center, with a pair of through holes 402a, 402b provided on both sides of the groove 401 for inserting optical fiber element wires or optical fibers. The optical connection structure shown in FIG. 7 can be formed by inserting the sheet-shaped viscous connection member 21 into the groove 401 vertically to the through holes, inserting optical fibers 10a, 10b with their tips stripped and cut into the through holes 402a, 402b in the connection alignment member 40, and then pressing the end face of each optical fiber against the sheet-shaped viscous connection member 21. In this case, the optical fibers can be positioned easily by using the connection alignment member. Also by inserting the sheet-shaped viscous connection member into the groove in the connection alignment member, the sheet-shaped viscous connection member can be stored inside the connection alignment member to improve the ease of handling and increase the effectiveness of preventing dust attachment.

The means and method for positioning optical fibers using the connection alignment member are not limited in particular, as long as the end faces of optical fibers are positioned along the same axis. It is possible to insert optical fibers into through holes as shown in FIG. 7, or optical fibers can be placed on a V-groove or other alignment groove. Also, the size of the connection alignment member is not limited in particular, and any size can be selected as deemed appropriate for the type or number of optical fibers. The shape is not limited in particular, either. For example, the connection alignment member can have a semi-cylindrical shape, rectangular shape or any other shape. Also, the structure and shape of through holes are not limited in particular, and for example a flat plate made of glass, etc., can be placed over a V-grooved board and the groove thus made into a closed space can be used as a through hole. In this case, optical fibers can be placed from above. Also, an existing member such as a MT connector ferrule can also be used as the connection alignment member. The material for constituting the connection alignment member is not limited in particular, but materials having a small friction coefficient such as polyacetal resin, materials offering good mechanical characteristics such as strong resistance to heat deformation, materials that do not corrode such as stainless steel, trifluoroethylene resin and tetrafluoroethylene resin, or materials having small reactivity to chemical substances and solvents, are preferable.

The connection alignment member may also comprise multiple members, and, for instance, it can have a structure in which a member that has a groove for inserting the viscous connection member is combined with another member having through holes. Also, two alignment members each having a through hole and a guide pin hole, etc., can be accurately positioned by means of inserting a guide pin into the pin holes. Furthermore, the tip of each through hole can be made into a cone shape to facilitate the placement of an optical fiber. The groove provided in the connection alignment member for receiving the viscous connection member should only be such that the sheet-shaped viscous connection member can be inserted into the groove and thus affixed, and the shape or position of the groove or number of grooves are not limited in particular.

Figure 8:
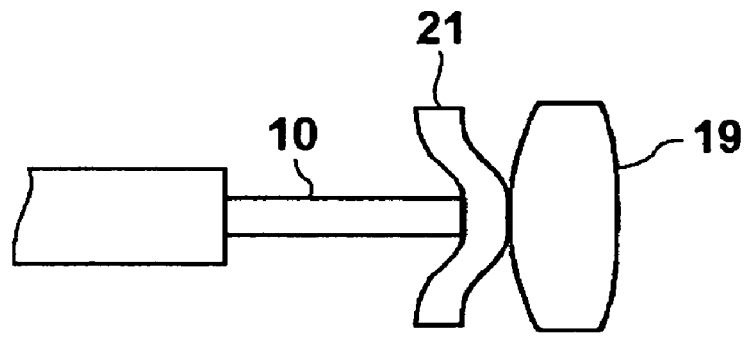
FIG. 8 is a plan view showing an example of the optical connection structure proposed by the present invention, in which an optical fiber is connected with an optical component.

FIG. 8 is a plan view showing an example of the optical connection structure proposed by the present invention, in which an optical fiber is connected with an optical component. In this figure, the optical connection structure can be formed by placing a sheet-shaped viscous connection member 21, optical fiber 10 and optical lens 19 at specified gaps in between, moving the end face of the optical fiber 10 until it adheres to the sheet-shaped viscous connection member 21, and then further moving the optical fiber 10 until the sheet-shaped viscous connection member 21 deforms and adheres to the optical lens 19. As shown in FIG. 8, by using the present invention any optical component having a convex shape, where the thickness decreases gradually or continuously from the center toward the periphery, can be easily connected optically. Based on the above method, the optical component can be retained in a securely and stably connected state. The viscous connection member only needs to allow the core of the optical fiber to adhere to the optical lens. Therefore, the viscous connection member can be easily separated from the optical lens, which prevents contamination of the optical lens.

Next, an optical connection structure in which the end faces of optical fibers are treated using a sheet-shaped viscous connection member, where the viscous connection member is provided only on the end face, is explained. FIGS. 9 through 17 relate to this structure.

Figure 9:
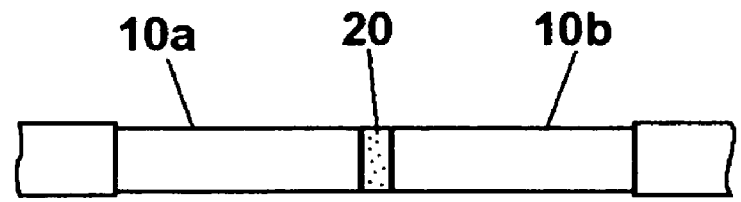
FIG. 9 is a plan view showing another basic example of the optical connection structure proposed by the present invention, produced by using a sheet-shaped viscous connection member.

FIG. 9 is a plan view showing another basic example of the optical connection structure proposed by the present invention, produced by using a sheet-shaped viscous connection member. To be specific, two optical fibers 10a, 10b are butted against each other via a viscous connection member 20, and as a result an optical connection structure in which the optical fibers are optically connected is formed. The two optical fibers are stripped by several tens of millimeters from their tips and the stripped tips have been cut. In this figure, the sheet-shaped viscous connection member is provided only on the end face of each optical fiber by means of the end-face treatment method illustrated in FIGS. 10 and 11 explained later.

Figure 5:
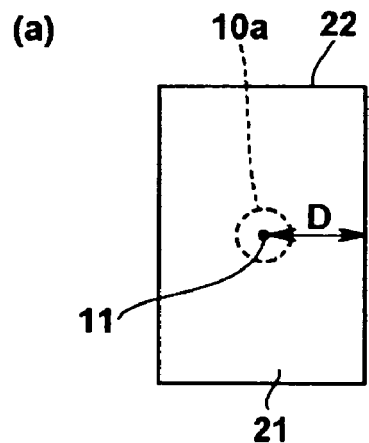
FIGS. 5(a) through (e) are plan views of sheet-shaped viscous connection members of various shapes being attached each to the end face of an optical fiber, as seen from the axial direction of the optical fiber.
FIG. 5(f) is a plan view of a viscous connection member provided only on the end face of an optical fiber.
Figure 5:
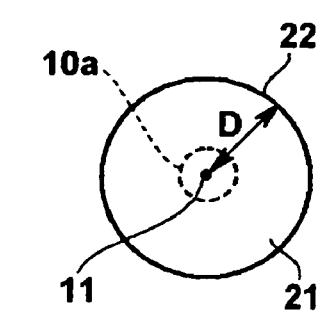
Figure 5:
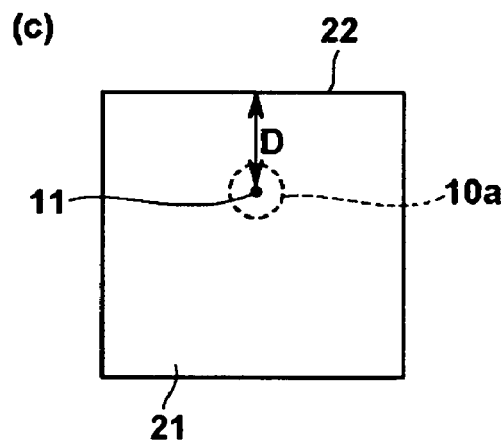
Figure 5:
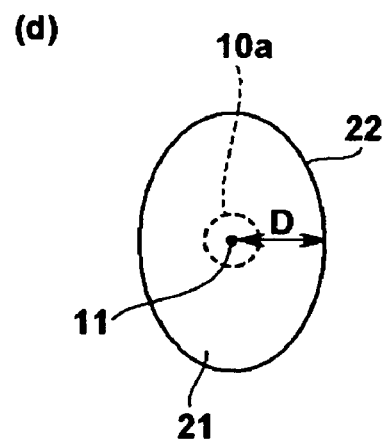
Figure 5:
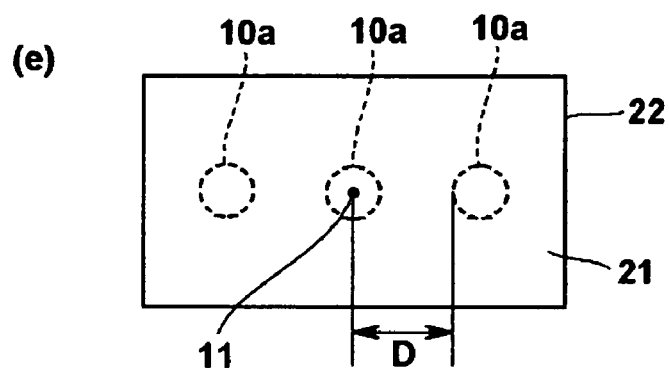
Figure 5:
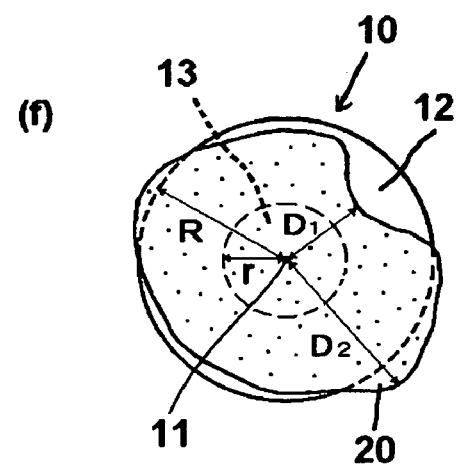

In the case of an optical connection structure with a viscous connection member provided only on the end face, as shown in FIG. 9, it is preferable that $D_1 \geq r$ and $D_2 \leq 1.5R$ be satisfied. FIG. 5 (f) explains this condition. D is the distance from the center 11 of the core of the optical fiber 10 comprising a core 13 and clad 12, to the periphery of the viscous connection member 20, R is the radius of the optical fiber, and r is the radius of the core. In the present invention, the minimum value $D_1$ of distance D from the center 11 of the core of the optical fiber 10 to the periphery of the viscous connection member 20 should preferably be equal to or greater than the radius r of the core, with the maximum value $D_2$ being equal to or smaller than 1.5 times the radius R of the optical fiber.

In the above case, the range occupied by the viscous connection member at least covers the entire core 13, and does not excessively protrude beyond the end face of the optical fiber by more than 1.5 times. This ensures that the connection member having viscosity exists only on or near the end face of each optical transmission medium, that contamination can be prevented, that dust attachment can be reduced, and that ease of handling can be improved. Also, there is no need to provide a separate, special means or structure to retain the viscous connection member, which embodies a very simple, space-saving connection structure. If $D_1$ is smaller than the radius r of the optical fiber core, areas not contacted by the viscous connection member remain on the core through which light is transmitted, which leads to optical transmission loss in these areas. If $D_2$ is greater than 1.5R, on the other hand, the percentage of the viscous connection member not contacting the end face of an optical fiber becomes large, thus inviting attachment of dust present in the ambience. Since the viscous connection member can also contact other component in this condition, good connection performance may not be maintained. So that the viscous connection member can be uniformly pressured and that it does not protrude from the end face of the optical fiber when the optical fiber is pressed, desirably $D_1$ should be roughly equal to $D_2$, and more desirably $D_1$ should be roughly equal to $D_2$ and to r.

In the above case, the viscous connection member is provided only on the end faces of butted optical fibers, and thus its size becomes roughly the same as the diameter of the optical fibers. Accordingly, the occupied area of the viscous connection member can be minimized and a very simple structure can be designed. Since there is no possibility of contact with dust present in the ambience, contamination does not occur. The viscous connection member does not flow out, either, which prevents contamination of the surroundings.

Figure 10:
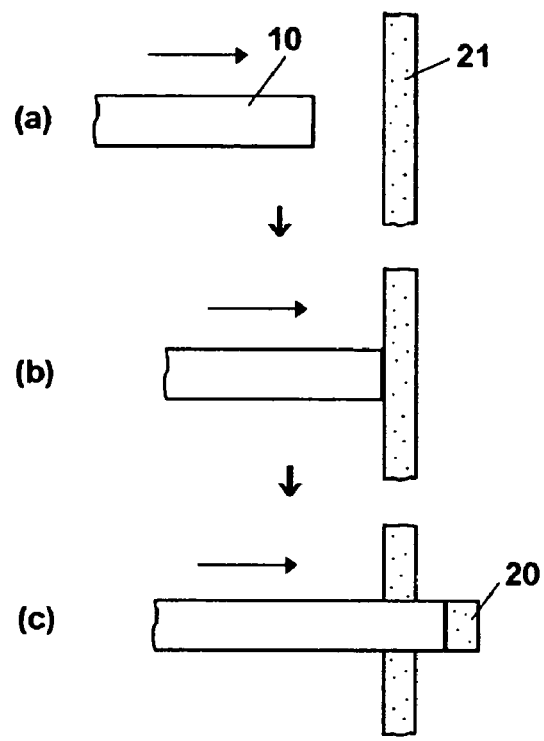
FIG. 10 is a process chart showing an example of how the end face of an optical transmission medium used in the present invention is treated to form the optical connection structure in FIG. 9.
Figure 11:
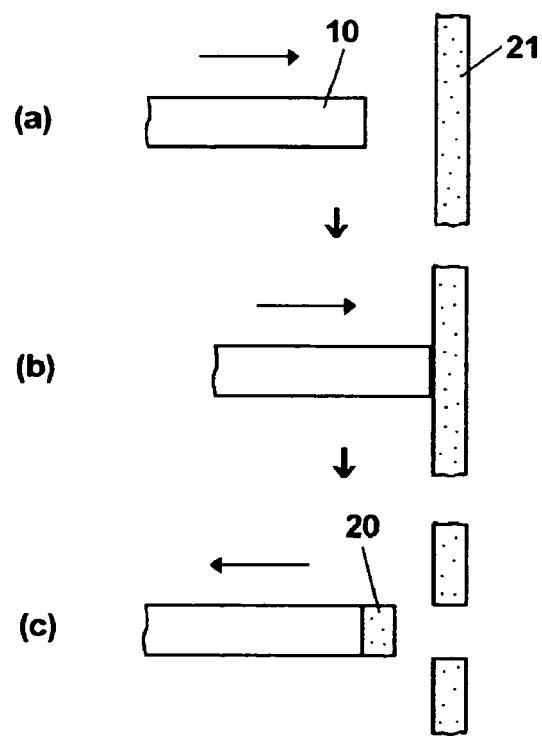
FIG. 11 is a process chart showing another example of how the end face of an optical transmission medium used in the present invention is treated to form the optical connection structure in FIG. 9.

FIGS. 10 and 11 are process charts each showing an example of how the end face of an optical transmission medium used in the present invention is treated to form the optical connection structure in FIG. 9, and illustrate basic examples of attaching a sheet-shaped viscous connection member only on an end face. In FIG. 10, an optical fiber is used as an optical transmission medium. In FIG. 10, a sheet-shaped viscous connection member 21 is placed next to an optical fiber 10 whose end has been stripped and cut. Both ends of the sheet-shaped viscous connection member are affixed in position using other appropriate member that is not shown. First, the optical fiber 10 is moved relative to the sheet-shaped viscous connection member 21 until its end face contacts the sheet-shaped viscous connection member. Next, the optical fiber is further moved in the axial direction to cause a part of the sheet-shaped viscous connection member to be separated while it is still attached to the end face of the optical fiber, to provide a viscous connection member 20 on the end face of the optical fiber.

In FIG. 11, the optical fiber 10 is moved relative to the sheet-shaped viscous connection member 21 until its end face contacts the sheet-shaped viscous connection member. Then, the optical fiber is moved in the opposite direction to cause a part of the sheet-shaped viscous connection member to be separated while it is still attached to the end face of the optical fiber, by means of the viscosity of the viscous connection member, to provide a viscous connection member 20 on the end face of the optical fiber. This method requires only a smaller moving range of the optical fiber than in the method illustrated in FIG. 10, so the production space can be reduced further.

Figure 12:
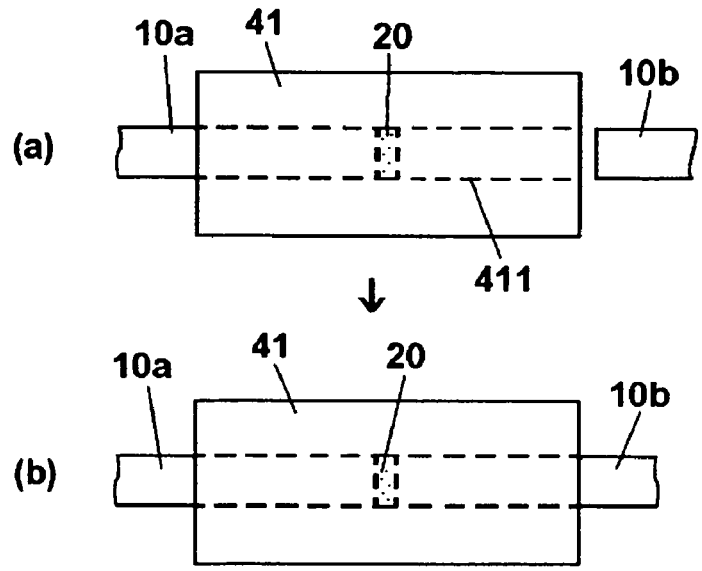
FIG. 12 is a process chart explaining a favorable example of producing an optical connection structure conforming to the present invention.

FIG. 12 is a process chart explaining a favorable example of producing an optical connection structure conforming to the present invention, specifically illustrating how an optical connection structure is formed using a connection alignment member. To be specific, an optical fiber 10a whose tip has been stripped and cut and which has a viscous connection member 20 attached to the end face in the manner shown in FIGS. 10 and 11 above is inserted into a through hole 411 provided in a connection alignment member 41 (FIG. 12(*a*)). Next, another optical fiber 10b whose tip has been stripped and cut is inserted from the opposite end of the through hole, and the end face of this optical fiber is pressed against the viscous connection member to achieve optical connection (FIG. 12(*b*)). Under this invention, the viscous connection member covers the end faces of optical fibers over the minimum range required for connection, and therefore this method can be implemented within an alignment member having a narrow through hole. Since there is no need for a special member to retain the viscous connection member, the optical fibers can be moved freely in the axial direction. When optical components are mounted, therefore, the optical fiber positions can be adjusted freely while still being connected. By using a connection alignment member, the viscous connection member can be stored inside the connection alignment member, which improves ease of handling and also increases the effectiveness of preventing dust attachment.

Figure 13:
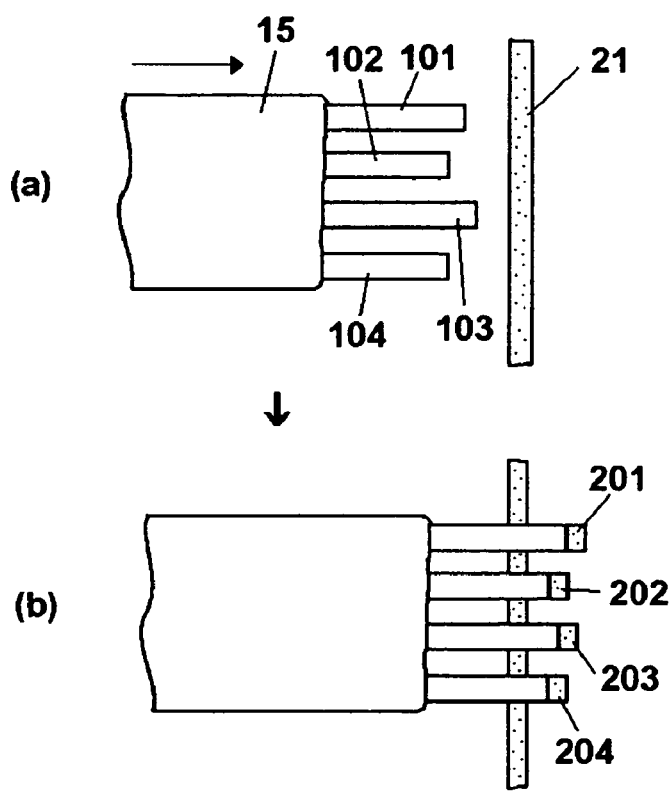
FIG. 13 is a process chart showing an example of how the end face of an optical transmission medium is treated to produce an optical connection structure conforming to the present invention.

FIG. 13 is a process chart showing another example of how the end face of an optical transmission medium is treated to produce an optical connection structure conforming to the present invention, specifically illustrating the end-face treatment of multiple optical fibers using one sheet-shaped viscous connection member. As shown in FIG. 13, an optical fiber tape 15 whose tip has been stripped and cut is moved in the axial direction of the optical fiber to cause the end faces of optical fibers 101-104 to contact a sheet-shaped viscous connection member 21 being supported by a supporting member not shown (FIG. 13(*a*)). Then, the optical fiber tape is moved further to cause a part of the sheet-shaped viscous connection member to be separated while it is still attached to the end face of each optical fiber, to simultaneously provide viscous connection members 201-204 on the end faces of optical fibers 101-104 (FIG. 13(*b*)). In this case, any variation in the cutting of the tip of each optical fiber comprising the optical fiber tape 15 does not affect the process, so the connection member can be adhered uniformly to each optical fiber. While the figure only shows four optical fibers, the number of optical fibers is not limited in particular.

Figure 14:
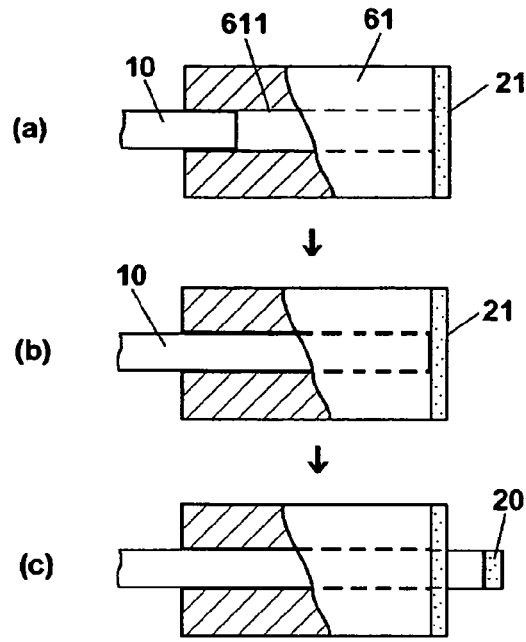
FIG. 14 is a process chart showing an example of how the end face of an optical transmission medium is treated to produce an optical connection structure conforming to the present invention.

FIG. 14 is a process chart showing an example of how the end face of an optical transmission medium is treated to produce an optical connection structure conforming to the present invention, specifically illustrating a case in which an end-face treatment member is used to support a sheet-shaped viscous connection member for the purpose of end-face treatment. In the figure, an end-face treatment member 61 has one through hole 611 into which an optical fiber or optical fiber element wire can be inserted. On one side of the end-face treatment member, a sheet-shaped viscous connection member 21 is attached in a manner covering the through hole. An optical fiber 10 whose tip has been stripped and cut is inserted into the through hole 611 (FIG. 14(*a*)), and moved until the sheet-shaped viscous connection member contacts the end face of the optical fiber 10 (FIG. 14(*b*)), after which the optical fiber is moved further until it comes out of the through hole, to cause a part of the sheet-shaped viscous connection member to be separated while it is still attached to the end face of the optical fiber, thereby attaching a viscous connection member 20 to the end face of the optical fiber (FIG. 14(*c*)). As shown in this figure, providing the end-face treatment member 61 to support the sheet-shaped viscous connection member 21 allows the sheet-shaped viscous connection member to be separated in accordance with the shape of the optical fiber, which improves the yield. Also, a viscous connection member can be attached reliably to the end face of an optical fiber having a certain angle.

Figure 15:
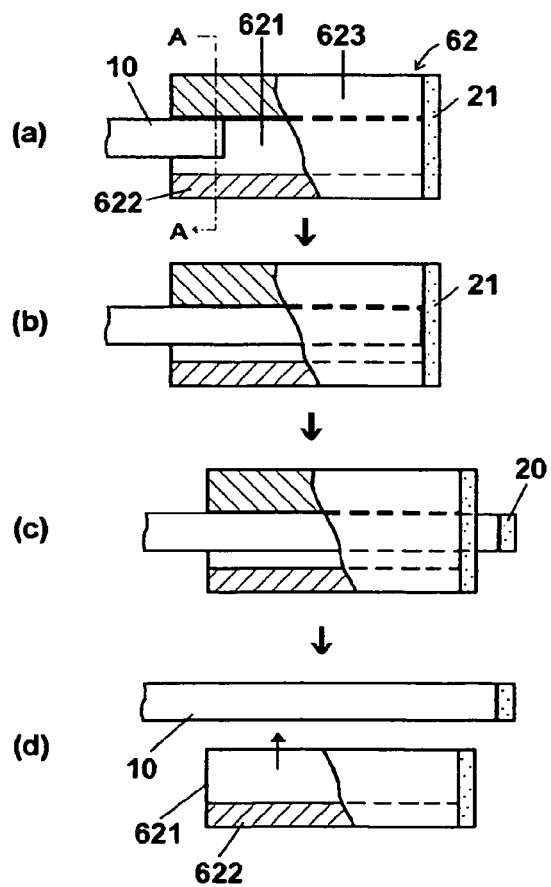
FIG. 15 is a process chart showing an example of how the end face of an optical transmission medium is treated to produce an optical connection structure conforming to the present invention.
Figure 16:
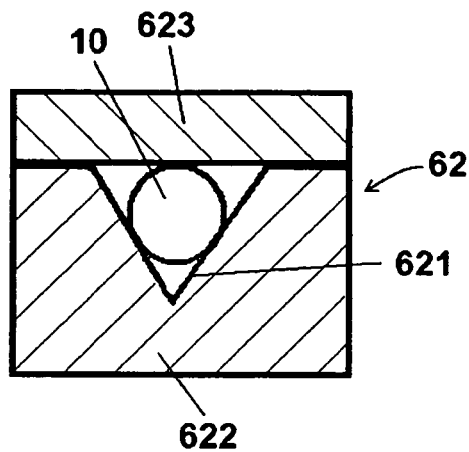
FIG. 16 is a section view of A-A in FIG. 15.

FIG. 15 is a process chart showing an example of how the end face of an optical transmission medium is treated to produce an optical connection structure conforming to the present invention, specifically illustrating a case in which an end-face treatment member is used to support a sheet-shaped viscous connection member. FIG. 16 is a section view of A-A in FIG. 15. In these figures, an end-face treatment member 62 comprises a flat top plate 623 made of glass, etc., placed on a bottom board 622 having a V-shaped alignment groove 621 through which an optical fiber is guided, and can also be used as a positioning member. The alignment groove 621 and flat top plate 623 form a through hole. A sheet-shaped viscous connection member 21 is attached and affixed to one end of the end-face treatment member (FIG. 15(*a*)). When this kind of end-face treatment member is used, the flat top plate 623 can be placed on the bottom board 622 after the optical fiber 10 has been placed in the alignment groove (FIG. 15(*a*)). The optical fiber 10 placed in the alignment groove is then moved in the axial direction along the alignment groove to cause its end face to contact the sheet-shaped viscous connection member 21 (FIG. 15(*b*)), after which the optical fiber is moved further to have a viscous connection member 20 attached to its end face (FIG. 15(*c*)). After the optical fiber passes through the through hole, the flat top plate 623 can be removed to easily retrieve the optical fiber 10, on which a viscous connection member has been formed, from above (FIG. 15(*d*)).

In the present invention, the method to position optical fibers is not limited in particular, as long as the end faces of optical fibers are positioned along the same axis, when an optical connection structure is formed with end treatment using an end-face treatment member to support a sheet-shaped viscous connection member like the one shown in FIG. 14 or 15. Also, the size and shape of the end-face treatment member are not limited in particular, either, and the end-face treatment member is formed using the same material as the connection alignment member described in FIG. 7 above.

Figure 17:
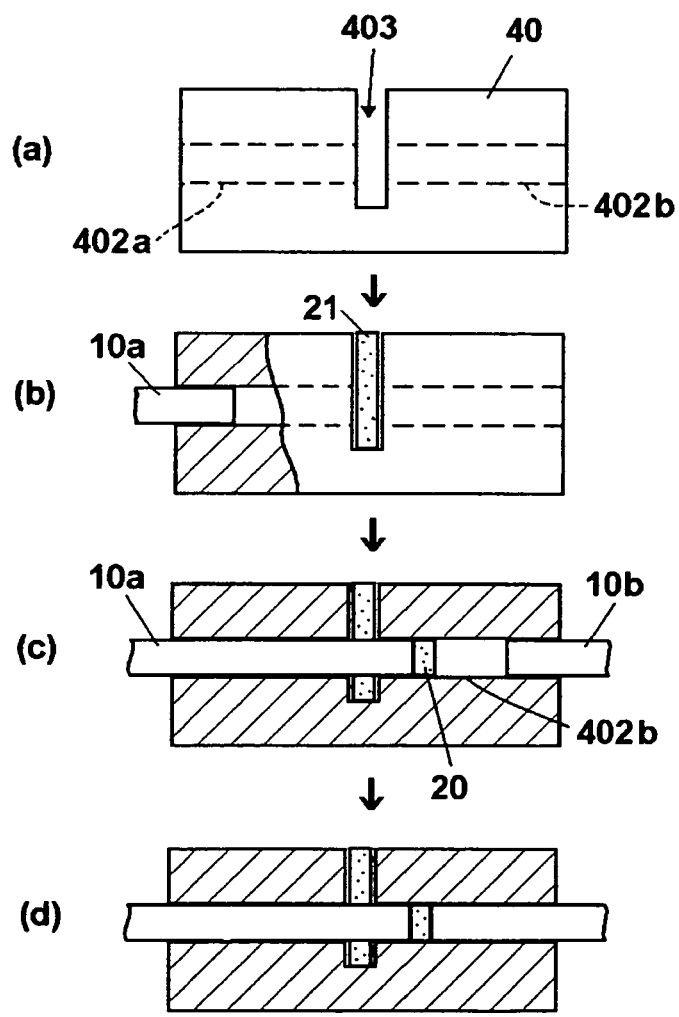
FIG. 17 is a process chart showing an example of the optical connection method for forming optical connection structure proposed by the present invention.

FIG. 17 is a process chart showing an example of the optical connection method for forming optical connection structure proposed by the present invention, specifically illustrating a case in which a connection alignment member is used to support a sheet-shaped viscous connection member. In the figure, a connection alignment member 40 has a deep groove 403 near the center for supporting a sheet-shaped viscous connection member, and a pair of coaxial through holes 402a, 402b are provided on both sides of the deep groove, meaning that this connection alignment member not only has a function for aligning optical fibers, but it also provides a function for supporting a sheet-shaped viscous connection member (FIG. 17(a)). First, the sheet-shaped viscous connection member 21 is inserted into the deep groove 403 vertically to the through holes (FIG. 17(b)). Next, an optical fiber 10a that has been stripped and cut is inserted into one through hole 402a until the end face of the optical fiber contacts the sheet material inside the through hole, after which the optical fiber is further moved and inserted into the other through hole 402b. This way, a part of the sheet-shaped viscous connection member is separated and a viscous connection member 20 attaches to the end face of the optical fiber (FIG. 17(c)). Next another optical fiber 10b is inserted from the other through hole and moved until it adheres to the viscous connection member (FIG. 17(d)). Based on the method illustrated by this figure, the position of the contact point of optical fibers can be freely set, which significantly improves the ease of handling and workability.

In the present invention, the sheet-shaped viscous connection member can be installed in an adapter, or it can be installed in a split sleeve in a manner supported by a supporting member. These conditions are shown in FIGS. 18 through 23.

Figure 18:
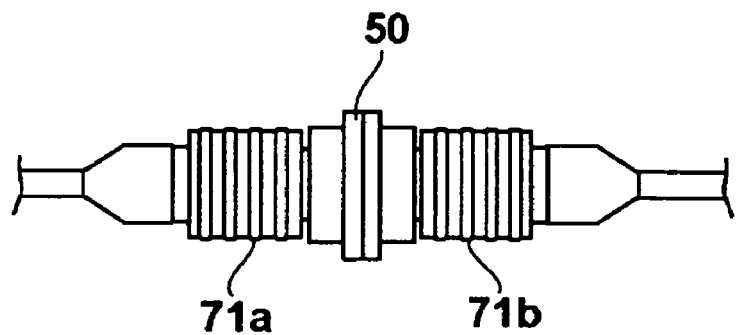
FIG. 18 is a side view of a MPO connector plug with MT ferrules to which optical fibers are connected.

FIG. 18 shows a condition in which MPO connector plugs 71a, 71b, each having a MT ferrule that aligns and holds an optical fiber, are connected via an adapter 50. As for this adapter, one shown in FIG. 19 or 20 can be used, for example.

Figure 19:
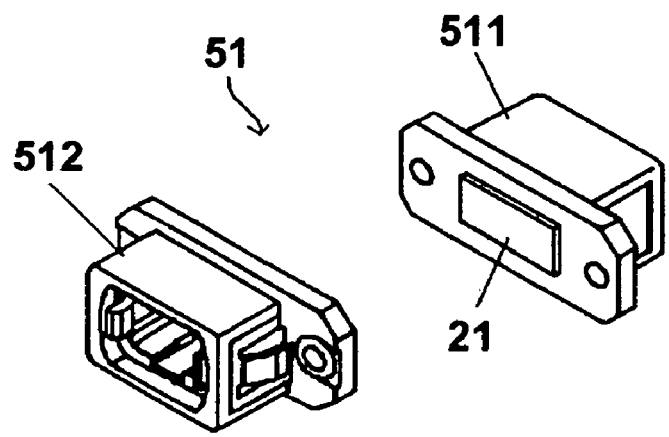
FIG. 19 is a perspective view of an example of the adapter for MPO optical connector.

In FIG. 19, a sheet-shaped viscous connection member 21 held at top and bottom using appropriate members is placed near the center of the location where MT ferrules are butted against each other in an adapter. Specifically, the sheet-shaped viscous connection member 21 is placed on one part 511 of the MPO adapter split into two parts, and the other part 512 is connected via screws, etc., to form an adapter in which the viscous connection member is placed inside. By placing beforehand in an adapter a connection member made of sheet-shaped viscous material, as explained above, attachment of contaminants, dust and other foreign matter from the surrounding environment onto the connection member can be prevented. Also, there is no need to place a connection member on the end face of each ferrule, which is favorable as it improves workability.

Figure 20:
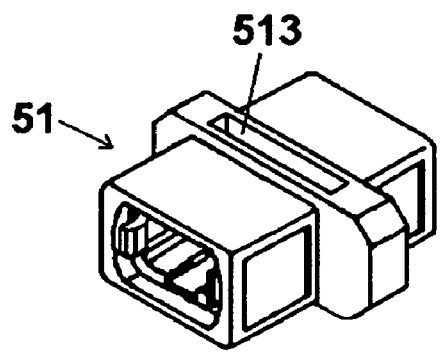
FIG. 20 is a perspective view of another example of the adapter for MPO optical connector.

In FIG. 20, a MPO adapter 51 has a groove 513 with an open top near the center of the location where MT ferrules are butted against each other. A sheet-shaped viscous connection member held at top and bottom, like the one shown in FIG. 6(a) above, is inserted into this groove. By providing a mechanism like this one for installing a viscous connection member in a manner supported by a supporting member inside an adapter, it becomes easy to replace the supporting member that supports the sheet-shaped viscous connection member, and workability improves as a result. This mechanism is also economical because one adapter can be used multiple times to achieve optical connection.

Figure 21:
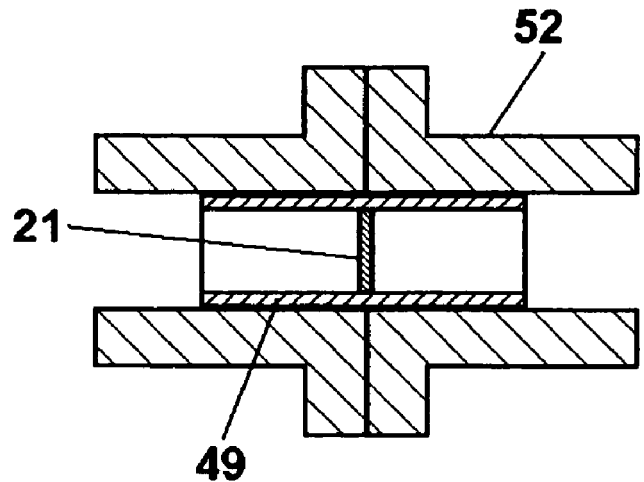
FIG. 21 is a schematic section view of an adapter applicable to a FC optical connector.
Figure 22:
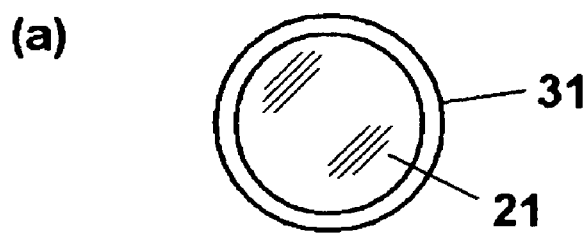
Figure 22:
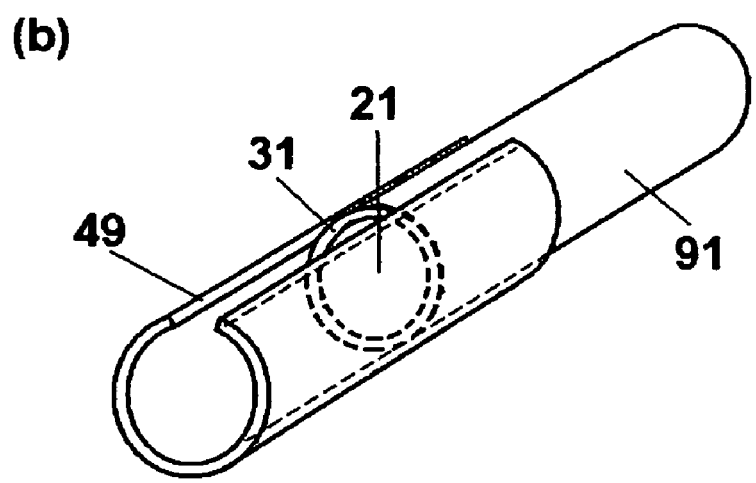

FIG. 21 is a side section view of an adapter used to apply the present invention to a FC optical connector. In FIG. 21, an adapter 52 has a split sleeve 49, and a sheet-shaped viscous connection member 21 is placed near the center of the split sleeve. As for the viscous connection member, hardenable viscous material is introduced from the slit in the split sleeve before the split sleeve is installed into the adapter, and then the material is hardened into film. By providing beforehand a sheet-shaped viscous connection member inside the split sleeve in the adapter, the connection member can be reliably placed on the end face of a ferrule, which improves workability.

The means for affixing the sheet-shaped viscous connection member is not limited in particular, and the material can be affixed in a split sleeve by means of hardening, as explained above. However, it is preferable that the connection member remains affixed at all time, and the supporting member explained below can be used, for instance.

FIG. 22(a) shows a condition in which a sheet-shaped viscous connection member conforming to the present invention is supported by a supporting member, in which the supporting member 31 is circular, has the same cross-section shape as the ferrule, and is holding the outer periphery of a sheet-shaped viscous connection member 21. FIG. 22(b) is a perspective view explaining a condition in which a sheet-shaped viscous connection member supported by the supporting member shown in FIG. 22(a) is installed inside a split sleeve. The sheet-shaped viscous connection member 21 supported by the supporting member 31 is installed vertically to the split sleeve 49, and then pushed into the split sleeve by means of a cylindrical pressure member 91 having the same diameter as the inner diameter of the split sleeve until the sheet-shaped viscous connection member is placed near the center. By supporting the sheet-shaped viscous connection member using the supporting member, as explained above, installation of ferrules becomes easy. Also, the sheet-shaped viscous connection member can be replaced simply by removing the ferrules, pushing in the supporting member using the pressure member 91, and retrieving the sheet-shaped viscous connection member from the split sleeve. Therefore, the split sleeve and adapter can be reused directly.

Figure 23:
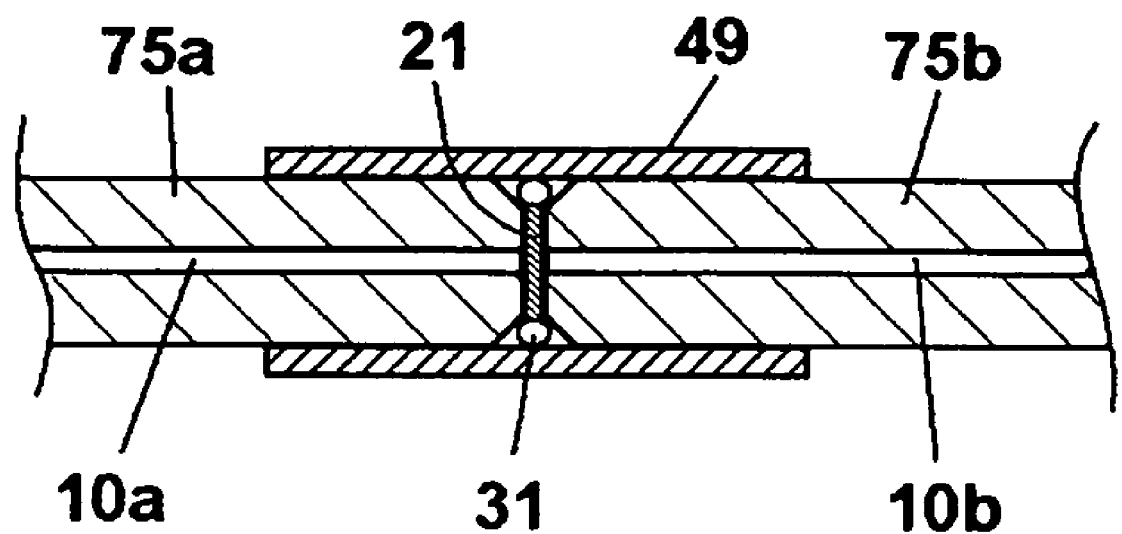
FIG. 23 is a section view explaining how ferrules are butted against each other using the split sleeve in FIG. 22(b).

FIG. 23 is a section view explaining how ferrules are butted against each other using the above split sleeve. As shown in FIG. 23, a pair of ferrules 75a, 75b affixing optical fibers 10a, 10b, respectively, are inserted into a split sleeve 49 in which a sheet-shaped viscous connection member 21 supported by a supporting member 31 is installed. These ferrules have a convex tip, so when they are optically connected a gap is formed by the convex tips of butted ferrules. The supporting member 31 is positioned in this gap formed by the ferrules, without interfering with the contact of the sheet-shaped viscous connection member 21 and end faces of ferrules, and thus an optical connection structure is formed.

Next, a case when the viscous connection member does not have a sheet shape, but it is made of material that freely changes its shape, is explained. FIGS. 24 through 29 give examples of this condition.

Figure 24:
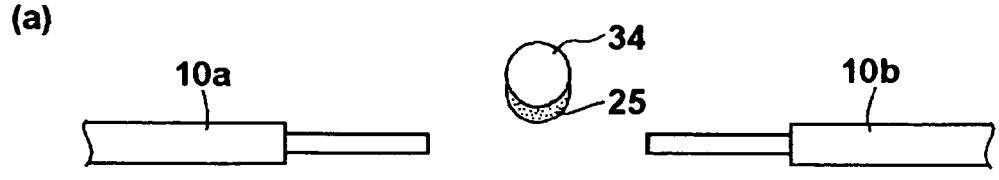
FIG. 24 is a process chart showing an example of forming an optical connection structure conforming to the present invention.
Figure 24:
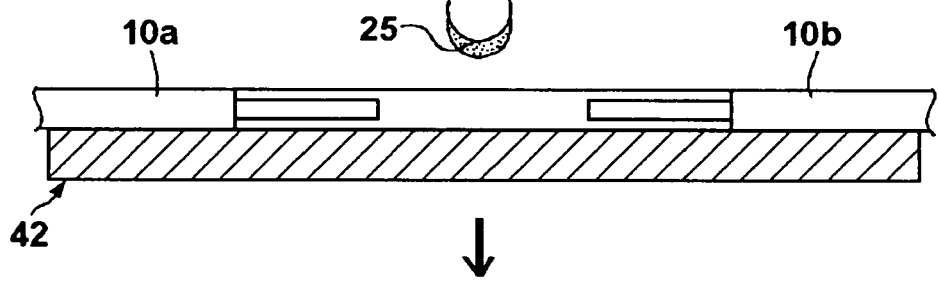
Figure 24:
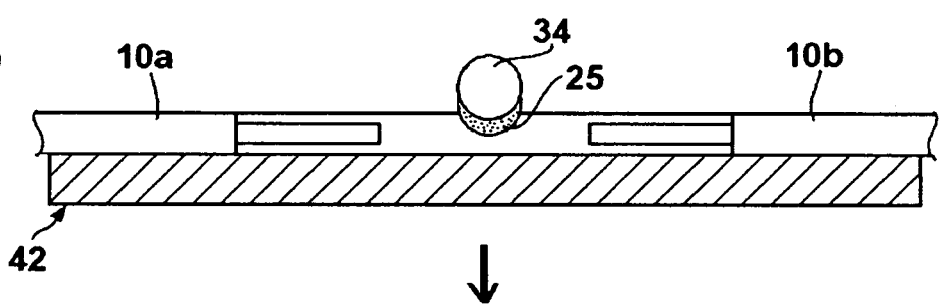
Figure 24:
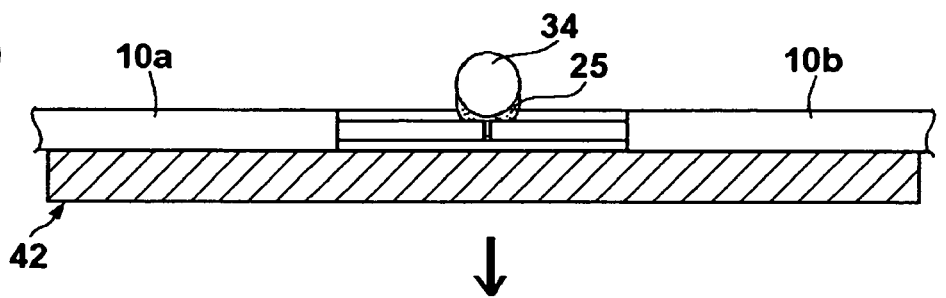
Figure 24:
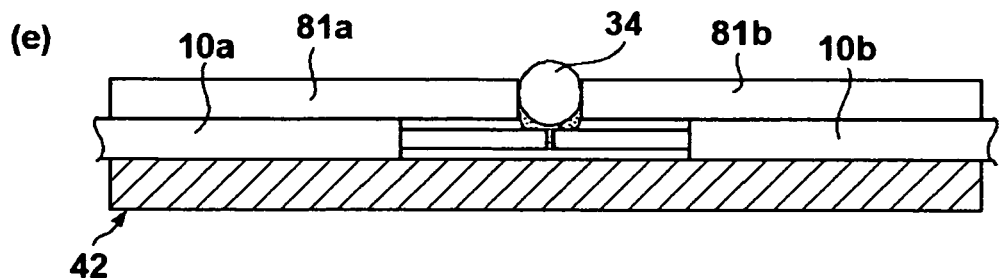

FIG. 24 is a process chart showing an example of forming an optical connection structure conforming to the present invention, using a viscous connection member that freely changes its shape. As shown in FIG. 24(a), a pair of optical fibers 10a, 10b, an alignment member 42 having a V-shaped alignment groove 421 of a reverse triangular shape, and a supporting member 34, are prepared. The supporting member 34 is a cylinder, and its bottom outer periphery (a part of the outer periphery) is covered with a solid viscous connection member 25 that has refractive-index matching property and freely changes its shape. Also, the optical fibers 10a, 10b have their ends stripped and end faces cut. Next, the pair of optical fibers 10a, 10b are placed above the V-groove 421 in the alignment member 42, as shown in FIG. 24(b). At this time, the optical fibers are placed in such a way that an appropriate gap is kept in between. Next, the supporting member 34 is placed on the alignment member 42 so that the supporting member is positioned between the two optical fibers 10a, 10b, as shown in FIG. 24 (c), and then loosely affixed by a viscous member not shown. This way, the viscous connection member 25 applied on the bottom outer periphery of the supporting member 34 sags into the V-groove 421. Next, the two optical fibers 10a, 10b are moved and butted against each other below the supporting member 34, as shown in FIG. 24(d). This way, the tips of optical fibers 10a, 10b contact the viscous connection member 25, and hence an optical connection structure conforming to the present invention is formed in which the deformed viscous connection member is disposed between the optical fibers 10a, 10b. As shown in FIG. 24(e), it is desirable that the optical fibers 10a, 10b be affixed by means of plate-type retainer members 81a, 81b, etc., from above.

In the above case, the viscous connection member 25 is supported by the supporting member 34, and therefore the operator can directly handle the optical fibers 10a, 10b without coming in contact with the viscous connection member 25. Also, since a specified amount of viscous connection member 25 is provided on the bottom outer periphery of the supporting member 34, the connection member 25 can be installed only on the connected end faces of optical fibers 10a, 10b, and therefore the area around the connection point is not contaminated and there is no attachment of dust, etc. Moreover, the optical fibers 10a, 10b can be positioned above the V-groove 421, so they can be optically connected without causing an offset between their optical axes.

Figure 25:
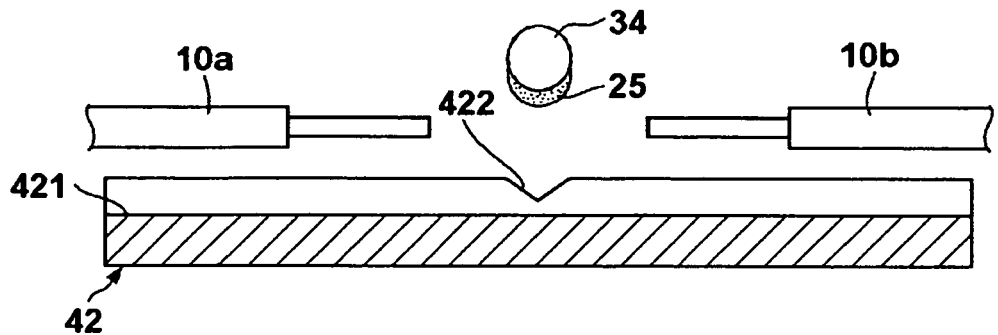
FIG. 25 is a drawing showing another example of an alignment member that is a component of the optical connection structure proposed by the present invention.
Figure 26:
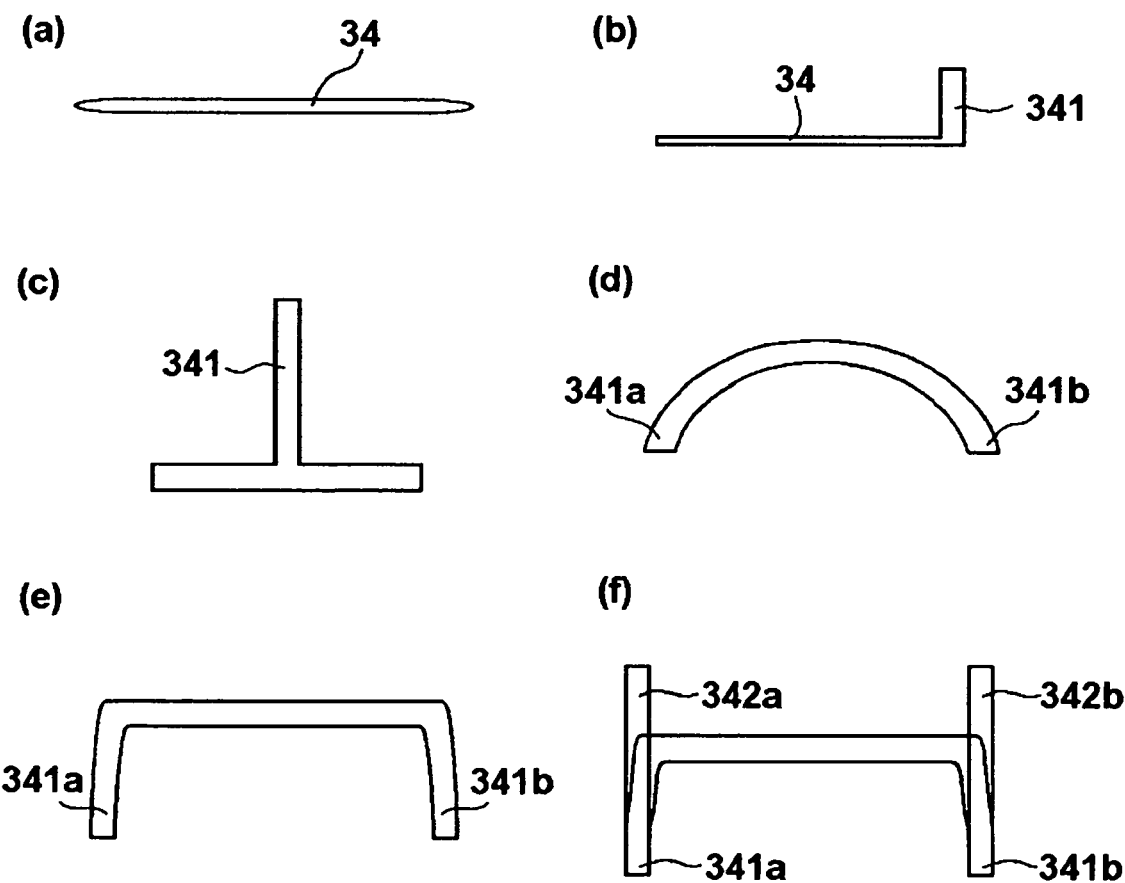
FIG. 26 provides front views each showing a supporting member used to support a viscous connection member that can freely change its shape.

In the above case, the alignment member 42 can have a V-groove 422 that is shallower than the alignment groove 421 and extending in the direction crossing with the alignment groove 421, as shown in FIG. 25. If this alignment member is used, the support member 34 that supports the viscous connection member can be placed on the V-groove 422, which enables the supporting member 34 to be easily affixed in position.

The supporting member for supporting the viscous connection member that freely changes its shape is not limited in particular in its material or shape. For example, a supporting member 34 having any of the shapes shown in FIGS. 26(a) through (f) can be used. In other words, this member can have various shapes such as a bar shape (FIG. 26(a)), L or T shape having one projection 341 (FIGS. 26(b) and (c)), shape having two projections 341a, 341b (FIGS. 26(d) through (f)), and so on. Its cross-section shape can be circle, oval, triangle, square or any other polygon. The material may be selected as deemed appropriate from among metals, glasses, plastics, rubbers, and the like. If holding parts 342a, 342b are provide in the upper section, as shown in FIG. 26(f), the supporting member can be held easily and the efficiency of installation improves. The above projections should be preferably set so that they engage with holes provided in the alignment member when the supporting member is placed on the alignment member, as it has the effect of stabilizing the supporting member.

Figure 27:
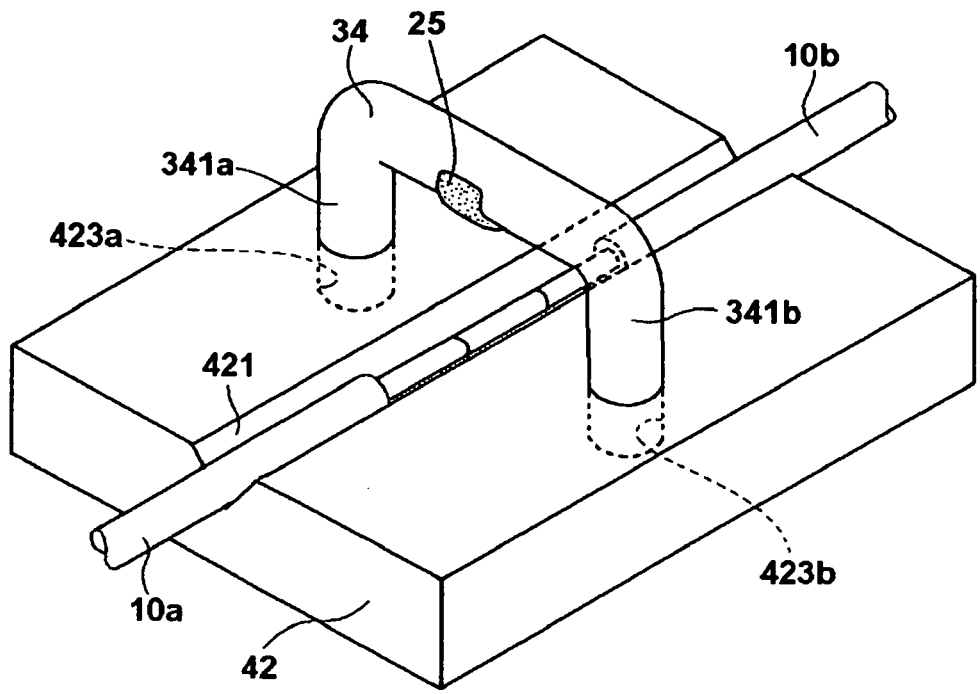
FIG. 27 is a perspective view of components of the optical connection structure proposed by the present invention.
Figure 28:
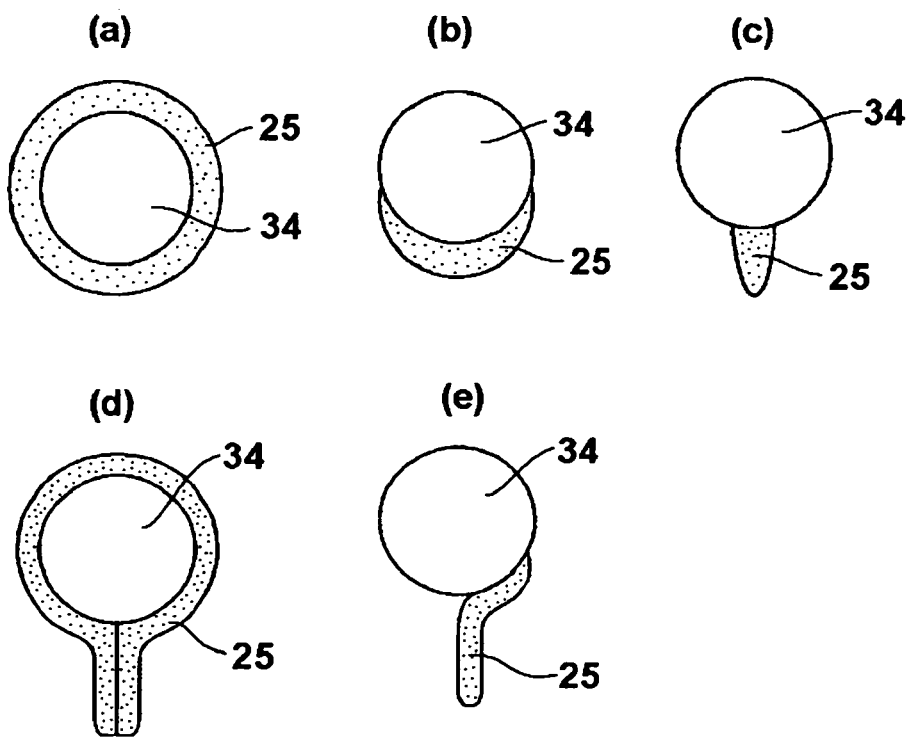
FIG. 28 provides section views each explaining the condition of a supporting member supporting a viscous connection member that can freely change its shape.

FIG. 27 explains how the supporting member shown in FIG. 26(e) is used to form an optical connection structure. An alignment member 42 has a V-groove 421 and a pair of holes 423a, 423b on both sides of the groove, so that projections 341a, 341b on a supporting member 34 holding a viscous connection member 25 are inserted into these holes 423a, 423b. In this configuration, the supporting member 34 and alignment member 42 can be easily positioned by placing the supporting member 34 over the alignment groove 421 in such a way that the projections 341a, 341b are inserted into the corresponding holes 423a, 423b, respectively. When achieving optical connection, this configuration stabilizes the position of the supporting member 34.

Where and how the viscous connection member is provided on the supporting member are not at all limited, and any position or method can be selected as deemed appropriate for the properties of the viscous connection member, among others. As for the position of providing a viscous connection member, for example, the viscous connection member can be provided over the entire outer periphery of the supporting member 34, as shown in FIGS. 28(a) and (d), or only at the bottom outer periphery of the supporting member 34, as shown in FIGS. 28(b), (c) and (e), in accordance with the position and size of the alignment groove.

As for the method to provide a viscous connection member on a supporting member, examples include: a method of applying a liquid viscous connection member using a sprayer, brush, etc., and then solidifying the liquid; and a method of making a viscous connection member into film and then wrapping the film around the outer periphery of the supporting member (FIG. 28(d)) or attaching the film to one part of the outer periphery (FIG. 28(e)).

Figure 29:
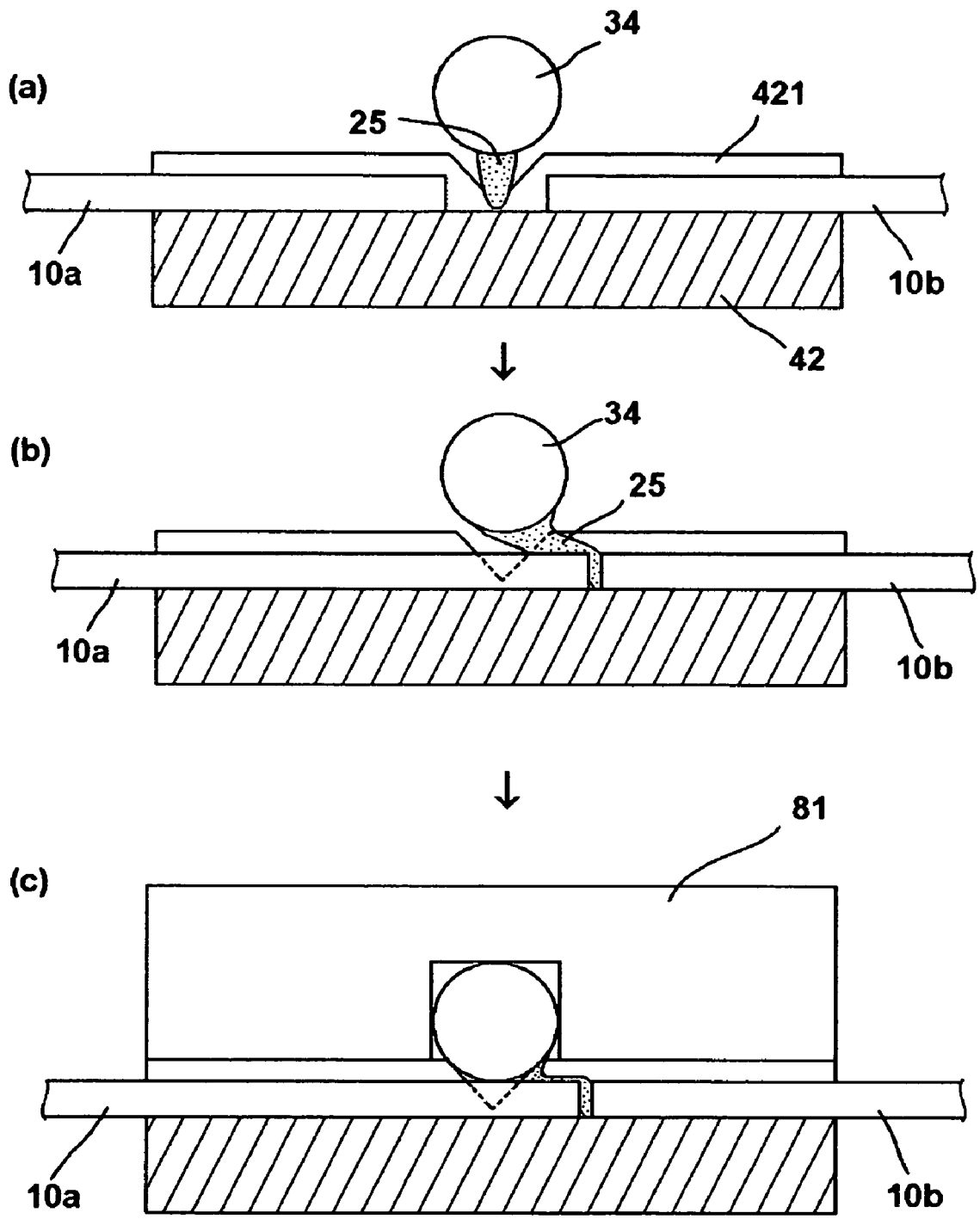
FIG. 29 is a process chart showing an example of forming an optical connection structure conforming to the present invention.

Under the optical connection structure proposed by the present invention, optical fibers 10a, 10b need not be connected directly under a supporting member 34. For example, the end faces of optical fibers can be connected at a position different from where a supporting member is placed, as shown in FIG. 29. In FIG. 29, the optical fibers 10a, 10b are placed in the alignment groove 421 in the alignment member 42 (FIG. 29(a)), and the left optical fiber 10a is moved to the right until its end face contacts the deformable viscous connection member 25 provided on the supporting member 34, and then the optical fiber 10a is moved further to the right until it contacts the end face of the left optical fiber 10b (FIG. 29(b)). This way, an optical connection structure conforming to the present invention is formed where the viscous connection member 25 is disposed between the optical fibers 10a, 10b in a manner adhering to both. In this case, the optical fiber 10a can be affixed by pressing down the supporting member 34 using a retainer member 81, as shown in FIG. 29(c).

In the present invention, the size of the above alignment member 42 is not limited in particular, and any size can be selected in accordance with the type or number of optical fibers. Its shape is not limited in particular, either. The alignment groove 421 can also be provided in any number according to the number of optical fibers, and if there are multiple optical fibers the pitch of alignment grooves 421 can be selected as deemed appropriate. In addition, the cross-section shape of the alignment groove 421 is not specifically limited, and the groove may have an oval, circular or rectangular shape in addition to V shape. If an alignment groove space exists near the end faces of optical fibers as in the case of the V-groove or rectangular groove, when the viscous connection member 25 deforms to be connected the extra material that has bulged out expands into this alignment groove space. Therefore, the distance between optical fibers decreases, and optical transmission loss is reduced as a result. Also, the viscous connection member adheres to the entire end faces of optical fibers, thereby stabilizing the optical connection of optical fibers. In particular, a V shape provides the most suitable groove structure because it permits easy placement and stabilization of optical fibers. Also, the material of the alignment member is not limited in particular, and any of the materials mentioned in connection with the alignment member shown in FIG. 7 can be used.

In the present invention, the viscosity retention distance of the viscous connection member should preferably be 10 μm or above. Here, the viscosity retention distance of the viscous connection member is measured as follows at a temperature of 23±1° C. and humidity of 45%.

Figure 30:
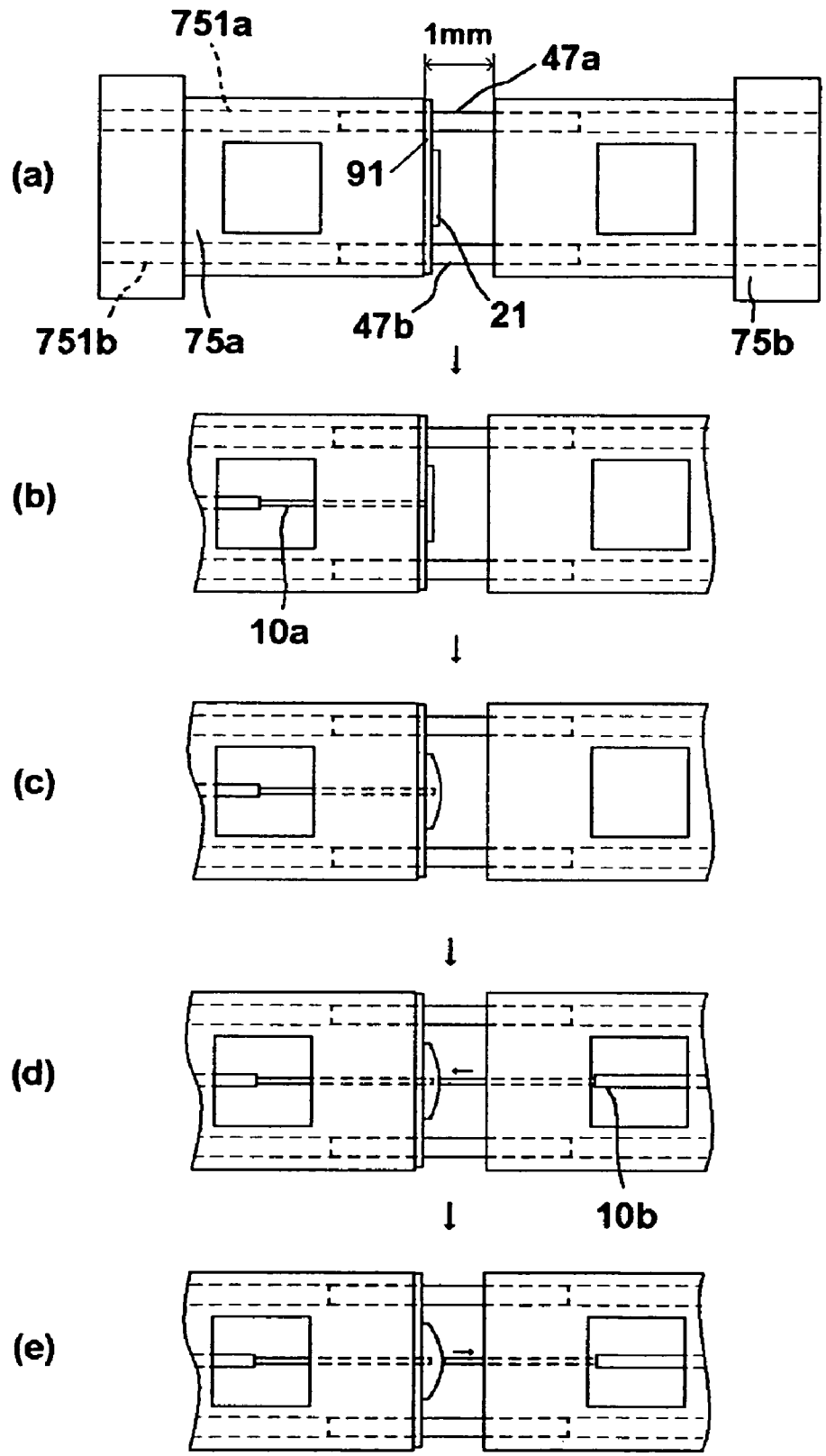
FIG. 30 provides drawings explaining how to measure the viscosity retention distance.
Figure 31:
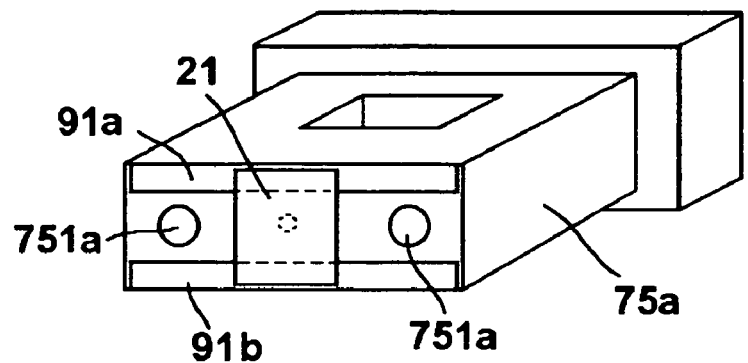
FIG. 31 is a perspective view of FIG. 30(a).
Figure 32:
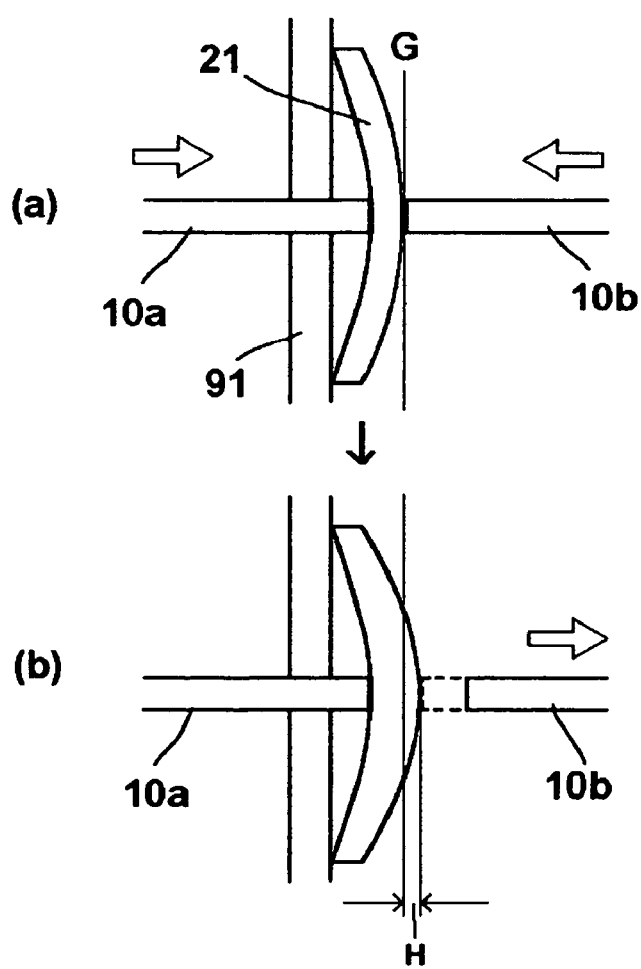
FIG. 32 provides enlarged views showing a part of FIG. 30.

FIG. 30 provides drawings explaining how to measure the viscosity retention distance, while FIG. 31 is a perspective view of a MT ferrule to which a viscous connection member is attached. FIG. 32 provides enlarged views of the connection point of optical fibers in FIG. 30. As shown in FIG. 30, on the end face of a MT ferrule 75a (8-core ferrule made of PPS, manufactured by Hakusan Mfg.), plastic films 91 (91a, 91b) (0.5 mm×7 mm in size) of 100 μm in thickness and having a 50-μm thick viscous layer formed on one side, are attached on top and bottom of through holes 751a, 751b, respectively, and a sheet-shaped viscous connection member 21 (2 mm×3 mm in size, 25 μm in thickness) is attached in a manner connecting the two films at the center (FIG. 31). Then, another MT ferrule 75b is placed in a manner facing the end face of the MT ferrule 75a, and the two ferrules are positioned via a guide pin, and then the MT ferrules 75a, 75b are affixed with a gap of 1 mm left between the end faces (FIG. 30(a)).

Next, an optical fiber 10a (single-mode fiber of 125 μm in clad diameter, manufactured by Furukawa Electric) whose tip has been stripped and cleaved is inserted into a through hole in the ferrule 75a, and the end face of the optical fiber is contacted with the viscous connection member (FIG. 30(b)), and then the optical fiber 10a is further projected to a point 250 μm from the contact point and affixed (FIG. 30(c)).

An optical fiber 10b of the same type is inserted into a through hole in the other MT ferrule 75b, and the end face of the optical fiber 10b is moved until it adheres to the viscous connection member. This contact position is given as origin G. Next, the optical fiber 10b is moved (in the direction of the arrow) until the gap between origin G and the end face of the optical fiber 10b becomes 10 μm, after which the optical fiber 10b is held in that condition for 2 seconds (FIG. 30(d), FIG. 32(a)).

Thereafter, the optical fiber 10b is gradually returned in the direction of the arrow at a speed of 10 μm/sec (FIG. 30(e)) to move the optical fiber 10b until the viscous connection member is separated from the core. Then, the distance between origin G and the position at which the viscous connection member separates from the core is measured, and the obtained distance H is used as the viscous retention distance (FIG. 32(b)).

The following explains, using examples, the optical connection structure proposed by the present invention, as well as the optical connection method to form the same. It should be noted, however, that the present invention is not at all limited to these examples.

EXAMPLE OF PRODUCING SHEET-SHAPED VISCOUS CONNECTION MEMBER 1

100 parts of 30% ethyl acetate solution of acrylic resin comprising n-butyl acrylate/methyl acrylate/acrylic acid/2-hydroxy ethyl methacrylate copolymer (blending ratio=82: 15:2.7:0.3) were mixed with 1.0 part of Collonate L (tolylene diisocyanate adduct of trimethyl propane, manufactured by Nippon Polyurethane Industry). The obtained viscous acrylic material coating solution was applied on one side of a plastic film on which mold-release agent had been applied, in such a way that the film thickness became 100 μm after drying, to produce a viscous acrylic material layer. This layer was separated from the plastic film when used (sheet-shaped viscous connection member (1)). When the light transmittance of the viscous acrylic material in a wavelength range of 1,300 to 1,320 nm was measured using a spectrophotometer, the reading was 93.5%. When the refractive index of the viscous acrylic material was measured using an Abbe refractometer, the reading was 1.465.

EXAMPLE OF PRODUCING SHEET-SHAPED VISCOUS CONNECTION MEMBER 2

An addition-type viscous silicone material coating solution comprising SD4590/BY 24-741/SRX212/toluene (=100:1.0:0.9:50 (percent by weight)) (all manufactured by Toray/Dow Corning) (an addition-type viscous silicone material whose main ingredient is SD4590 with BY24-741 and SRX212 added as hardeners) was prepared. This addition-type viscous silicone material was applied on one side of a polyethylene terephthalate film of 100 μm in thickness on which mold-release agent had been applied, in such a way that the film thickness became 50 μm after drying, to produce an addition-type viscous silicone material layer. This layer was separated from the polyethylene terephthalate film when used (sheet-shaped viscous connection member (2)).

EXAMPLE 1

Figure 33:
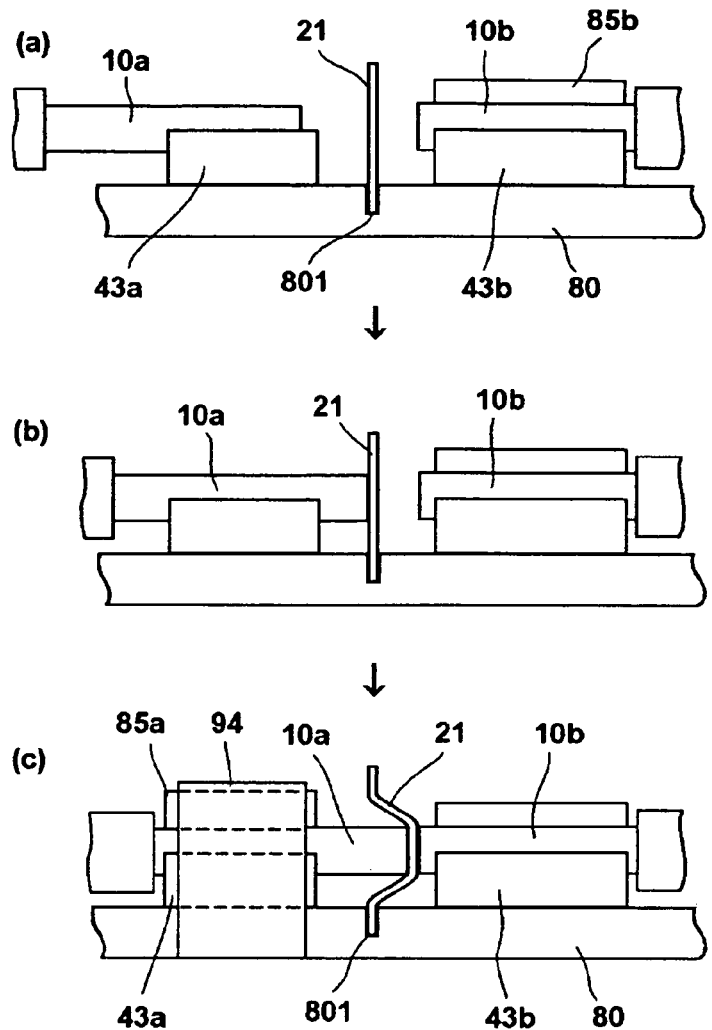
FIG. 33 is a process chart of forming the optical connection structure in Example 1.

Using sheet-shaped viscous connection member (1) obtained above, an optical connection structure was formed as shown in FIG. 33. First, the V-groove cross-sections of two V-grooved alignment members 43a, 43b (5 mm×10 mm in size) were positioned using an optical microscope. Then, the ends of V-grooves were aligned at a position 0.2 mm from a 0.05-mm slit 801 provided in a glass board 80, and the alignment members were affixed on the glass board 80 using adhesive. Thereafter, the above sheet-shaped viscous connection member 21 was inserted into the slit in the glass board and placed vertically to the surface of the glass board. Then, optical fibers 10a, 10b were placed inside the V-grooves in both alignment members 43a, 43b. Optical fibers were quartz optical fibers (single-mode fiber of 250 μm in diameter, manufactured by Furukawa Electric), each of which had been stripped by 25 mm from the end using a fiber stripper to expose the optical fiber element wire, which had then been cut using a fiber cutter at 10 mm from the end. While observing through an optical microscope, one optical fiber 10b was moved in parallel along the V-groove until the end of the optical fiber element wire came to an appropriate point away from the V-grooved board, and then the optical fiber 10b was sandwiched by a flat plate 85b and the alignment member 43b and affixed on the alignment member using UV adhesive (FIG. 33(a)). Next, the other optical fiber element wire 10a was moved until it adhered to the sheet-shaped viscous connection member 21 (FIG. 33(b)), and then the optical fiber element wire 10a was pressed against the optical connection member until the sheet-shaped viscous connection member adhered to its end face was butted against the optical fiber 10b. The thickness of the butted sheet-shaped viscous connection member was 10 μm. R was 62.5 μm, D was 1.5 mm, and D was 24R. Thereafter, the optical fiber 10a was sandwiched between a flat plate 85a and the alignment member 43a and affixed using an optical-fiber affixing jig 94 (FIG. 33(c)).

When the connection loss of the connected optical fibers was measured at a wavelength of 1,300 nm, the reading was 0.2 dB or below. When the reflection damping was measured, the reading was 50.3 dB. The numbers suggested good optical characteristics.

In addition, a temperature cycle test was conducted for 500 cycles in a temperature range of −25° C. to 70° C. As a result, the changes in optical transmission loss were 0.2 dB or below. When the viscous connection member was observed after removing the optical connection, no abnormality was found on the exterior.

EXAMPLE 2

Using sheet-shaped viscous connection member (2) obtained above, an optical connection structure was formed in the same manner as in Example 1. When the connection loss of the connected optical fibers was measured, the reading was 0.4 dB or below, indicating good optical characteristics. In addition, a heat resistance test (in conformance with JIS C 0021) was conducted with the optical connection structure left standing in an environment of 125±2° C., along with a temperature cycle test for 500 cycles in a temperature range of −40° C. to 75° C. As a result, the changes in optical transmission loss were 0.4 dB or below. When the viscous connection member was observed after removing the optical connection, no solidification or yellowing was found, showing that the optical connection component was sufficiently reusable.

EXAMPLE 3

Figure 34:
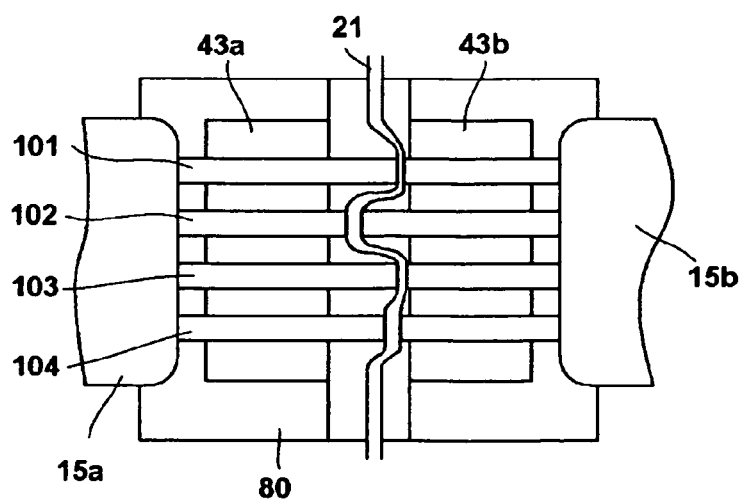
FIG. 34 is a plan view showing the optical connection structure in Example 3.

FIG. 34 is a plan view showing an optical connection structure that connects four-core optical fiber tapes. To achieve optical connection of four optical fibers on each side, connection operation was performed in the same manner as in Example 1, except that two four-core optical fiber tapes 15a (this fiber tape contains optical fibers 101-104), 15b and two V-grooved alignment members 43a, 43b affixed on a glass board 80 were used. As a result, four optical fibers could be easily connected optically using one sheet-shaped viscous connection member 21. When the lengths of cut optical fibers were measured, there was a variation of approx. ±10 μm among the four optical fiber element wires. Since the sheet-shaped viscous connection member deformed flexibly to adhere to and affix each optical fiber, however, the variation in optical transmission loss among the optical fiber element wires was small. Specifically, the changes in optical transmission loss over 100 detachment/reattachment tests were 0.3 dB or below with each optical fiber. In other words, the same sheet-shaped viscous connection member could be used to constantly maintain stable output, and the obtained optical connection structure was sufficiently reusable.

EXAMPLE 4

Figure 35:
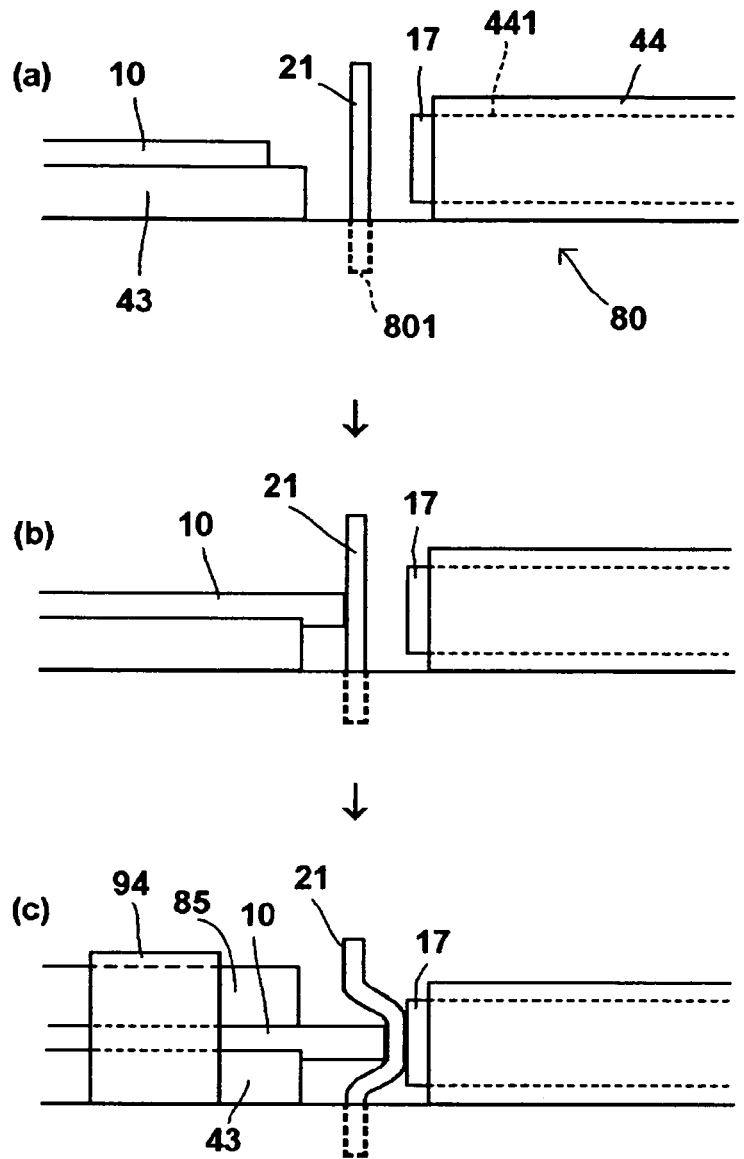
FIG. 35 is a process chart of forming the optical connection structure in Example 4.

FIG. 35 is a process chart of connecting an optical fiber and a rod lens. An optical fiber element wire 10 was placed in a V-groove provided in an alignment member 43 on a glass board 80 in the same manner as in Example 1. On the other hand, a rod lens 17 (2 mm in outer diameter, manufactured by mflends) was inserted through a rod-lens alignment member 44 (5 mm×5 mm×10 mm in size) having a 2.1-mm diameter through hole 441, and the end face of the rod lens was affixed using adhesive at a position appropriately distanced from the end face of the rod-lens alignment member, thus positioning the rod lens with respect to the V-groove. Then, the alignment member 43 and rod-lens alignment member 44 were affixed on the surface of the glass board using adhesive at 0.05 mm away from a slit 801 in the glass board 80. Thereafter, a sheet-shaped viscous connection member 21 was inserted into the slit and set (FIG. 35(a)). Next, the optical fiber was moved along the V-groove to cause the end face of the optical fiber to butt against the sheet-shaped viscous connection member (FIG. 35(b)), and then moved further until the sheet-shaped viscous connection member was deformed and the opposite side of the member adhered to the rod lens. Thereafter, the optical fiber 10 was sandwiched between a flat plate 85 and the alignment member 43, and the assembly was sandwiched by an optical-fiber affixing jig 94 and thus affixed (FIG. 35(c)). Even when optical transmission media of different sizes, or specifically optical fiber and lens, are connected as described above, by pressing the optical fiber against the viscous connection member and deforming the connection member, the lens and sheet-shaped viscous connection member could adhere to each other over the minimum area. Therefore, the two could be separated easily.

EXAMPLE 5

Figure 36:
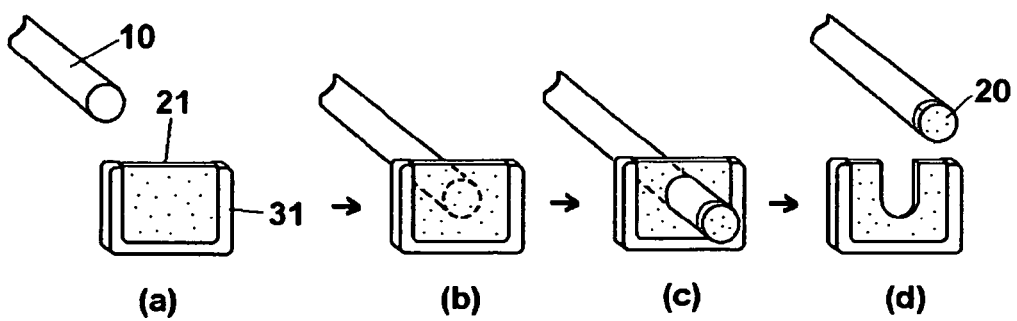
FIG. 36 is a process chart explaining the end-face treatment in Example 5.

The end face of an optical fiber was treated as shown in FIG. 36. Specifically, a viscous acrylic material whose refractive index had been adjusted to 1.46 was made into a sheet of 25 μm in thickness and 8 mm×16 mm in size and used as a sheet-shaped viscous connection member 21 to be used with optical members. This was attached on a U-shaped supporting member 31 of the same size as the sheet in a manner not forming wrinkles (FIG. 36(a)). Then, one optical fiber 10 (250 μm in outer diameter, 125 μm in clad diameter, and 10 μm in core diameter, manufactured by Furukawa Electric) was stripped by 20 mm from the end to expose the optical fiber element wire, and the optical fiber element wire was cut at 10 mm from the end. Next, the sheet material attached to the supporting member was placed in a manner adhering to the end face of the optical fiber element wire (FIG. 36(b)). Then, the optical fiber 10 was moved until the sheet-shaped viscous connection member, which was adhering to the end face of the optical fiber, was separated from the non-contacted part (FIG. 36(c)). Next, the optical fiber with a viscous connection member 20 attached to its end face was moved upward to remove the optical fiber from the supporting member 31 that was supporting the sheet (FIG. 36(d)). In this case, the periphery of the viscous connection member on the surface contacting the optical fiber was approx. 50 to 65 μm from the center of the core.

Figure 37:
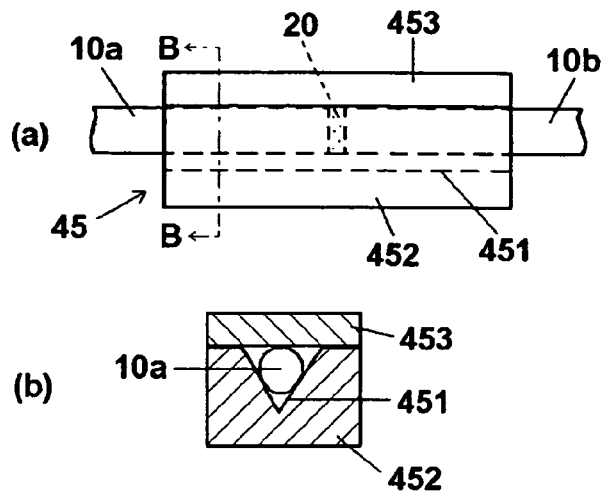
FIG. 37 provides drawings explaining the connection alignment member used in Example 5, where

Optical connection was made using an optical fiber 10a having this viscous connection member 20, as well as the alignment member 45 shown in FIG. 37. Specifically, the optical fiber 10a whose tip had been stripped and cut was placed on a bottom board 452 (10 mm×40 mm×10 mm) having a V-shaped alignment groove 451 of 250 μm in width and 250 μm in height at the center, so that the optical fiber rested inside the V-shaped alignment groove. On the other hand, a similar optical fiber 10b was placed in a manner opposing the other optical fiber. The two optical fibers 10a, 10b were moved closer to each other along the V-shaped alignment groove until they eventually contacted the viscous connection member 20. In this condition, a top flat plate 453 made of glass was placed from above and affixed onto the bottom board 452 having the V-shaped groove.

This way, the two optical fibers could be connected easily inside the V-shaped alignment groove without causing contamination in the surroundings. Also, the flexibility of the viscous connection member increased the degrees of freedom around the end face of each optical fiber, and thus prevented the optical fiber from receiving excessive pressure. As a result, optical connection could be made very easily without damaging the optical fibers. Furthermore, since the end faces of optical fibers adhered to each other due to the viscosity of the viscous connection member, the connection loss was kept to a low level of 0.3 dB. The formed connection structure of optical fibers had $D_1$ of 50 μm and $D_2$ of 65 μm.

The end-face treatment method for optical fibers as shown in FIG. 36 allowed the connection member affixed on the supporting member to be attached easily to the end face of the optical fiber simply by moving the optical fiber, which provided great ease of handling.

EXAMPLE 6

A viscous connection member was attached to the end face of an optical fiber in the same manner as in Example 1. Optical fibers were connected optically in the same manner as in Example 1, except that, in the optical connection process, the optical fibers were pressed against the viscous connection member until its thickness became 10 μm when the end faces of optical fibers were butted against each other via the viscous connection member, in order to deform the viscous connection member between the optical fibers. When the connection loss was measured, the reading was 0.2 dB. By deforming the viscous connection member as described above, the end faces of optical fibers could be placed closer to each other, which helped realize a smaller connection loss. In this example, $D_1$ was smaller than the fiber clad diameter (could not be measured), while $D_2$ was approx. 85 μm.

EXAMPLE 7

Figure 38:
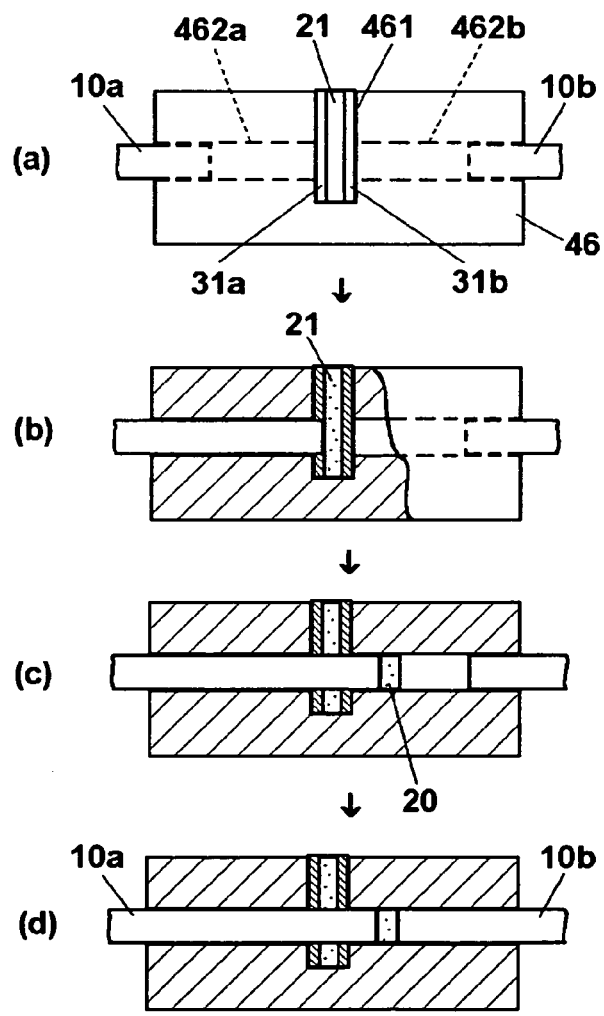
FIG. 38 is a process chart of forming the optical connection structure in Example 7.

Optical connection of optical fibers was made as shown in FIG. 38. A connection alignment member 46 (10 mm×20 mm×40 mm in size) had a deep groove 461 of 0.25 mm in width at the center, with a pair of through holes 462a, 462b. On the other hand, the sheet-shaped viscous connection member 21 used in Example 1 was sandwiched between two supporting members 31a, 31b (2-mm square of 0.1 mm in thickness) that were made of clear plastic resin and had a cavity at the center, to create a cartridge encasing the sheet-shaped viscous connection member. This cartridge was installed in the deep groove 461 of the connection alignment member, as shown in FIG. 38(*a*). Then, optical fibers 10a, 10b, stripped by 25 mm from the tips and cut, were inserted into the through holes, respectively, with one optical fiber 10a made to contact the sheet-shaped viscous connection member encased in the cartridge (FIG. 38(*b*)) and then pushed in further in a slow manner until a viscous connection member 20 was attached to the end face of the optical fiber (FIG. 38(*c*)). This optical fiber was moved to an appropriate position and affixed on the connection alignment member using adhesive. Next, the other opposing optical fiber 10b was moved and adhered to the viscous connection member (FIG. 38(*d*)). Thereafter, this optical fiber was affixed on the connection alignment member using adhesive.

By encasing the sheet-shaped viscous connection member in the connection alignment member and then separating a part of the sheet-shaped viscous connection member to make optical connection directly, as described above, the entire process from attachment of the viscous connection member to connection of the optical fibers could be carried out using one member. As a result, the optical connection became structurally stable and the viscous connection member was free from attachment of dust after the optical connection structure was produced, thus resulting in improved production efficiency. In this case, $D_1$ was smaller than the fiber clad diameter (could not be measured), while $D_2$ was approx. 65 μm.

EXAMPLE 8

Figure 39:
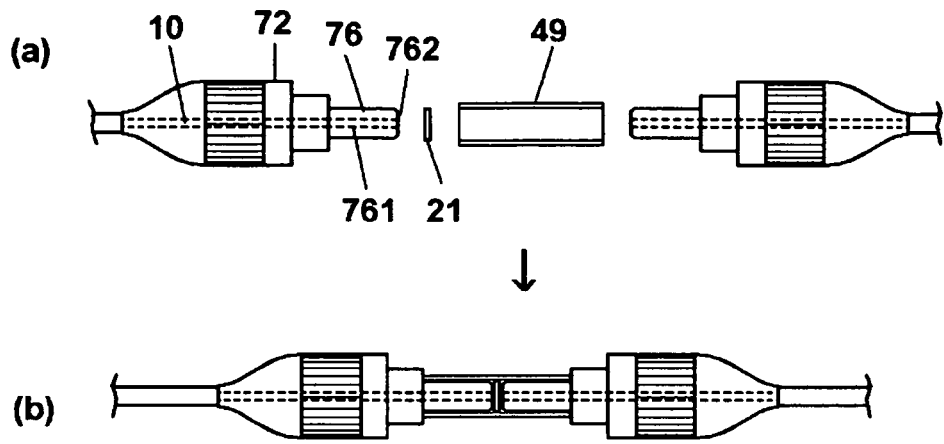
FIG. 39 is a process chart of forming the optical connection structure in Example 8.

FIG. 39 provides drawings showing an example of an optical connection structure (optical connector) conforming to the present invention for connecting single-core optical fibers. FIG. 39(*a*) shows the components of this optical connection structure, while FIG. 39(*b*) shows the components in a connected state. An optical fiber 10 that had been stripped at its end and cleaved was inserted into a through hole 761 in a FC-connector ferrule 76 provided in a FC connector plug 72, and its position was adjusted so that the end face of the optical fiber roughly aligned with the end face 762 of the ferrule, after which epoxy resin (Epotec 35, manufactured by Epoxy Technology Inc.) was introduced into the through hole as adhesive and then thermally hardened to affix the optical fiber. Next, a sheet-shaped viscous connection member 21 made of viscous acrylic resin and having a thickness of 25 μm was placed on the end face of the ferrule and adhered to the end face in a manner not allowing air to enter. This was inserted into a split sleeve 49 having a diameter corresponding to the ferrule diameter, and a facing ferrule was inserted from the other side and the two ferrules were butted against each other to form an optical connection structure conforming to the present invention (FIG. 39(*b*)).

EXAMPLE 9

Figure 40:
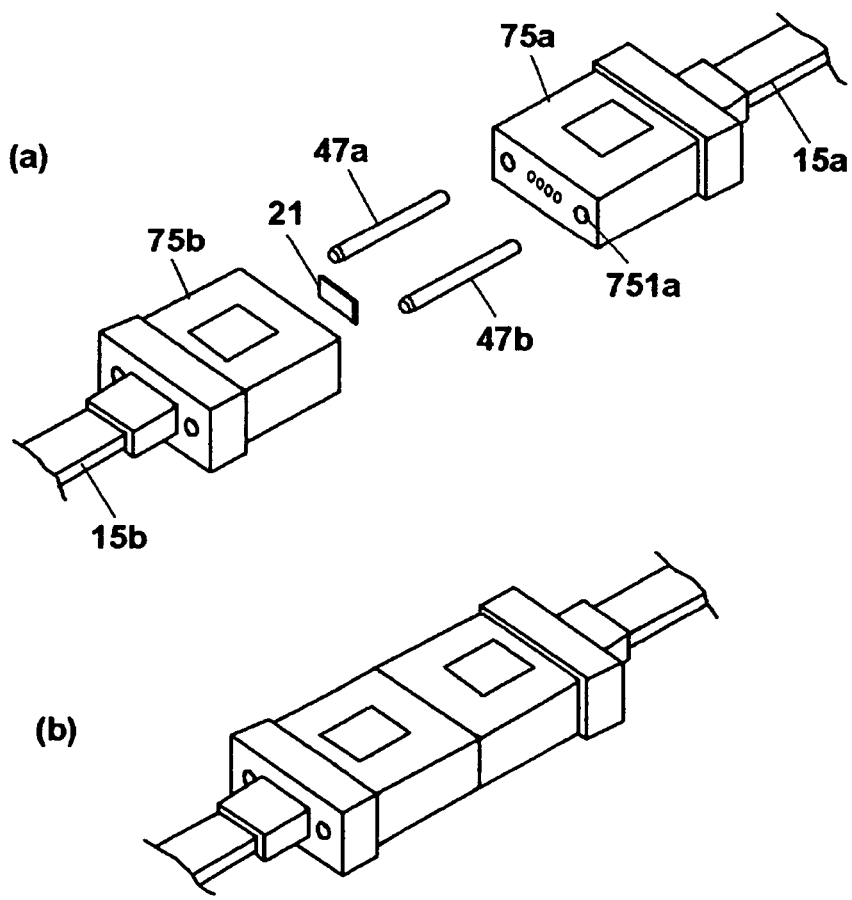
Figure 41:
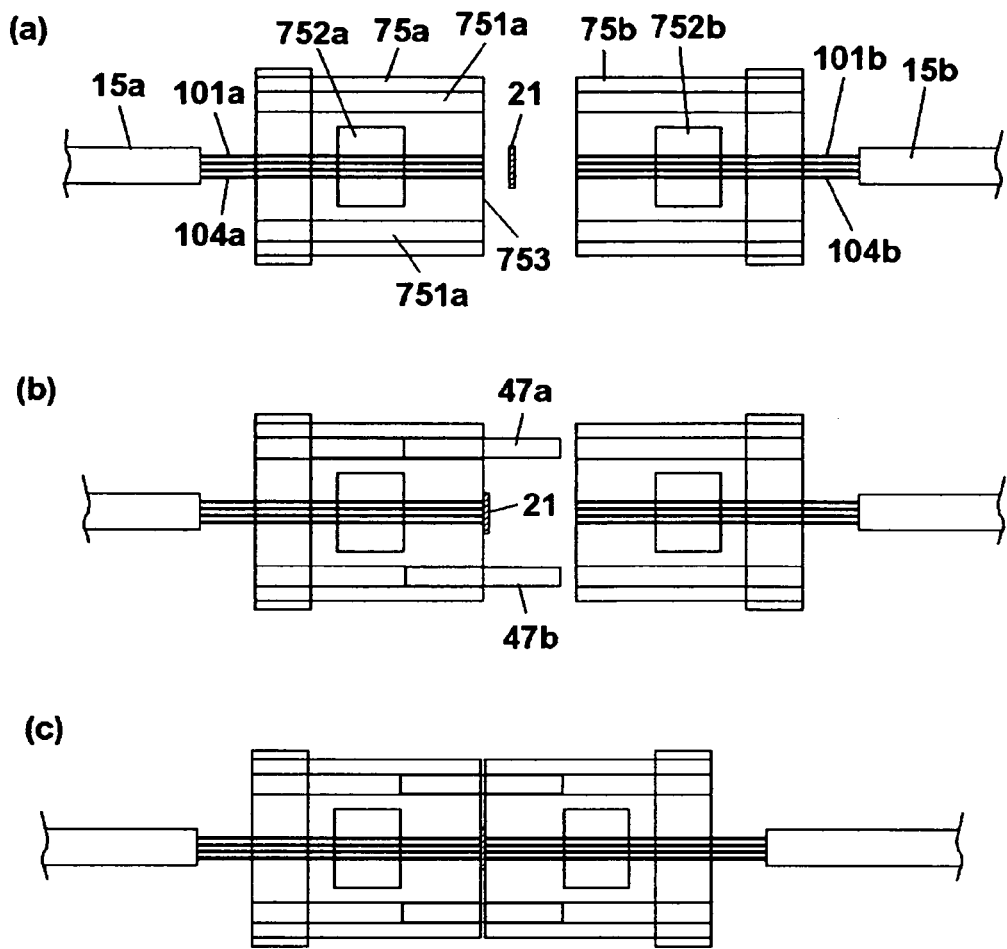
FIG. 41 is a process chart of forming the optical connection structure in Example 9.

FIG. 40 provides drawings showing an example of an optical connection structure (optical connector) conforming to the present invention for connecting multi-core optical fibers. FIG. 40 (*a*) shows the components of this optical connection structure, while FIG. 40(*b*) shows the components in a connected state. FIGS. 41(*a*) through (*c*) are drawings explaining a process of connecting the optical connector shown in FIG. 40. These figures illustrate four-core optical fiber tapes, but the number of optical fibers is not limited to four.

First, two sets of four optical fibers 101a-104a, 101b-104b, respectively belonging to optical fiber tapes 15a, 15b whose tips have been stripped and cleaved, were inserted into through holes provided in MT ferrules 75a, 75b, and their positions were adjusted so that the end face 753 of the ferrule roughly corresponded to the end face of the optical fibers, after which epoxy resin was introduced into adhesive application holes 752a, 752b and hardened to affix the optical fibers (FIG. 41(*a*)).

Next, guide pins 47a, 47b were inserted into two guide pin holes 751a, 751a provided in one MT ferrule, and a sheet-shaped viscous connection member 21 was placed on the end face 753 of this MT ferrule (FIG. 41(*b*)). Next, this MT ferrule 75a was connected to the other MT ferrule 75b via the guide pins 47a, 47b to form an optical connection structure conforming to the present invention (FIG. 40(*b*), FIG. 41(*c*)).

As described above, the optical connection structure conforming to the present invention could connect multiple optical fibers simultaneously using one sheet-shaped viscous connection member, thereby allowing every optical fiber to establish good optical connection.

The optical connection structure proposed by the present invention can also be applied to ferrules containing optical fibers whose end face has been ground, as used in normal connector connections. To be specific, in FIG. 41 the end face 753 of the MT ferrule and that of each fiber can be ground before connection and good optical characteristics are still achieved. In other words, ferrules produced by known processes can be utilized directly without adding special design or processing.

EXAMPLE 10

Figure 42:
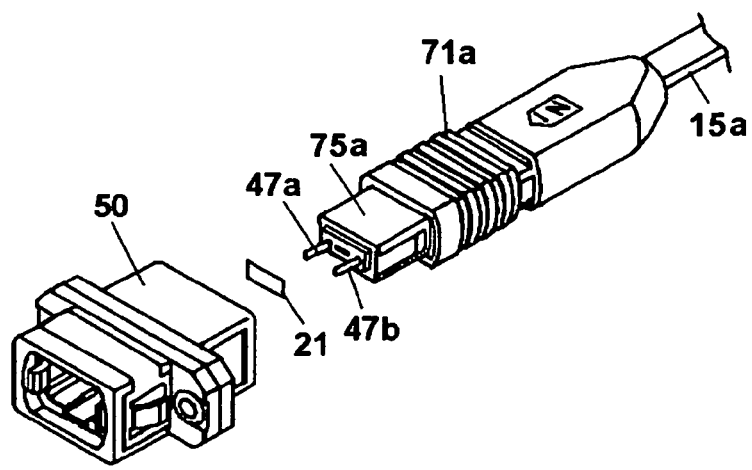
FIG. 42 is a perspective view showing the components of the optical connection structure in Example 10.
Figure 43:
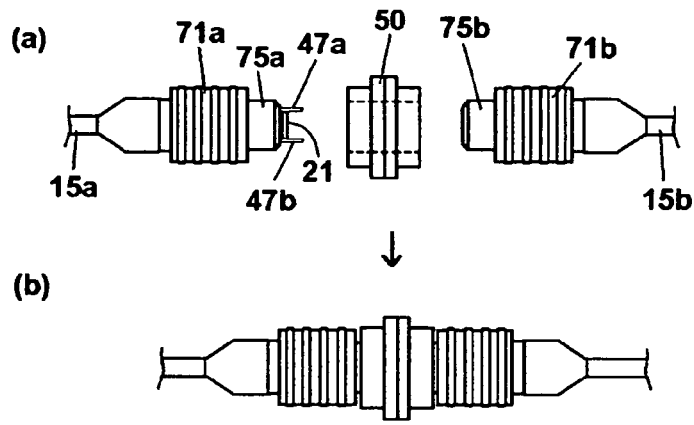
FIG. 43 provides drawings explaining the optical connection structure in Example 10.

FIG. 42 is a perspective view showing the components of an optical connection structure designed to apply the present invention to a MPO optical connector. FIG. 43 provides drawings showing how the MPO optical connector in FIG. 42 is connected, where FIG. 43(a) is a plan view showing a condition before connection, while FIG. 43(b) is a plan view showing a condition after connection. The present invention can also be used with existing multi-core connectors in addition to the MPO optical connector described below, such as MT-RJ, MPX, Mini-MT, Mini-MPO and other adapters and connector plugs containing MT ferrules.

In FIGS. 42 and 43, the MPO optical connector comprises a sheet-shaped viscous connection member 21; optical fiber tapes 15a, 15b; MT ferrules 75a, 75b aligning and holding optical fibers; MPO connector plugs 71a, 71b comprising a housing that can be detached and reattached via a push-pull mechanism; and a connection adapter 50 for connecting a pair of MPO connector plugs.

To connect optical fibers, first the sheet-shaped viscous connection member 21 is placed on the end face of one MT ferrule 75a, and guide pins 47a, 47b are inserted into guide pin holes provided on the end face of the MT ferrule 75a affixed by the MPO connector plug 71a (FIG. 43(a)). Next, the guide pins are inserted into guide pin holes provided in the facing MP ferrule 75b to connect the MPO connector plugs 71a, 71b with the connection adapter 50 via the housing while positioning the MT ferrule 75b (FIG. 43(b)). Here, the end faces of MT ferrules need not be ground. When optical connection is made, the end faces of MT ferrules adhere to each other via the viscous connection member inside the adapter to form an optical connection structure.

As described above, the optical connection structure proposed by the present invention keeps the connection loss small even when a non-ground MPO connector plug is used. The MPO connector plug is of push-pull type, so it can be detached and reattached easily.

In the above case, an adapter having a sheet-shaped viscous connection member placed on it, as shown in FIG. 19 or 20 above, can also be used.

EXAMPLE 11

Figure 44:
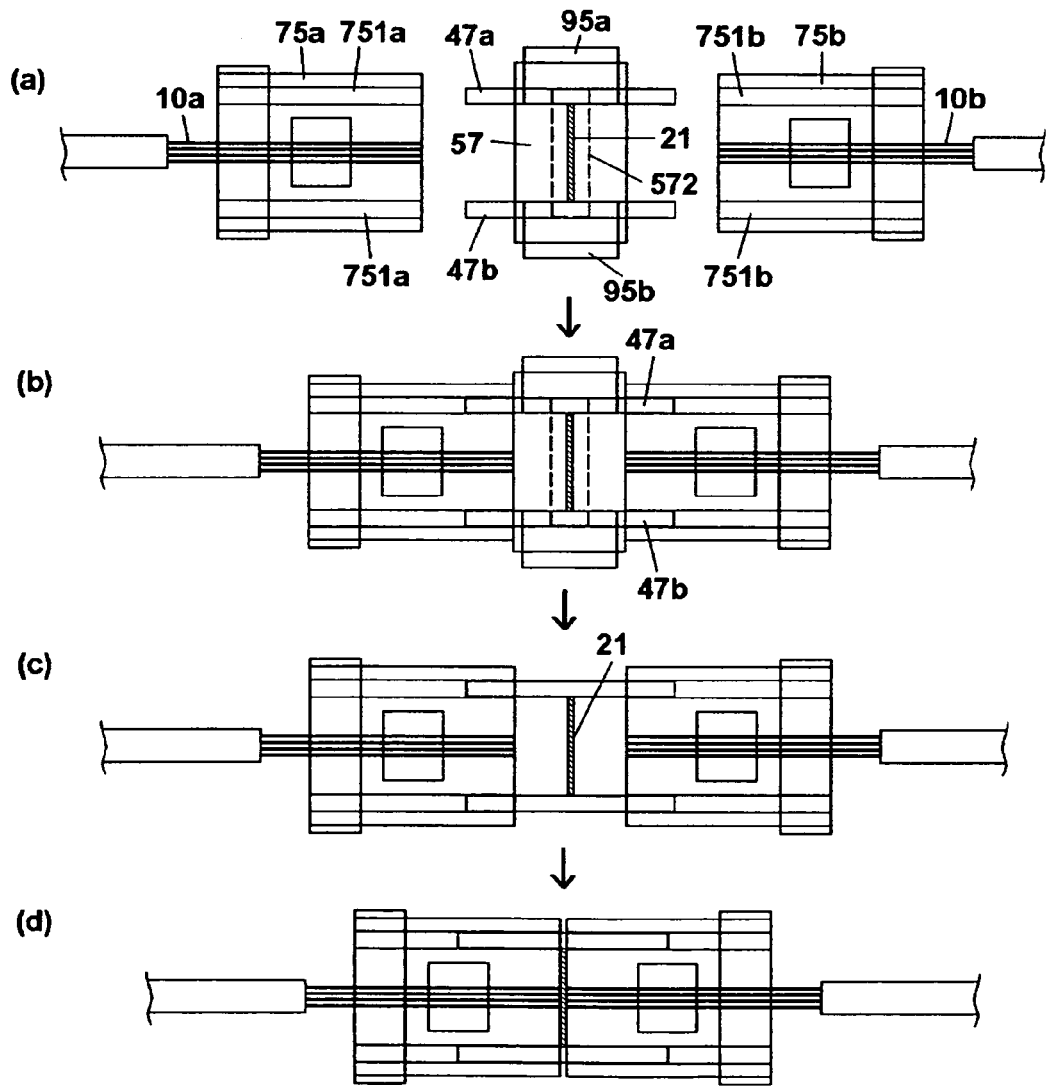
FIG. 44 is a process chart of forming the optical connection structure in Example 11.
Figure 45:
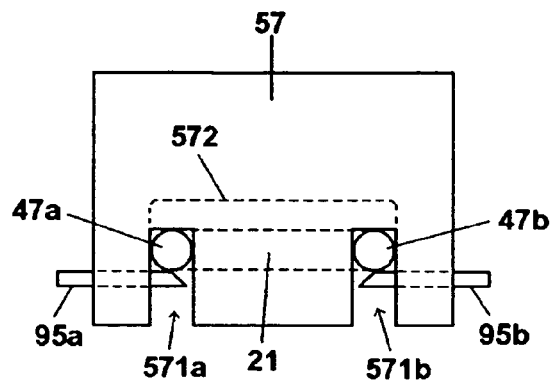
FIG. 45 is a front view of the guide-pin supporting member used in the optical connection structure in FIG. 11.

FIGS. 44(a) through (d) are drawings that explain a connection process for an optical connection structure (optical connector) conforming to the present invention, in which MT ferrules as well as a sheet-shaped viscous connection member having a supporting member are used. FIG. 45 is a front view of a guide-pin supporting member used in the connection process shown in FIG. 44. As shown in FIG. 44(a) and FIG. 45, two guide pins 47a, 47b are held by a guide-pin supporting member 57, and both ends of a sheet-shaped connection member 21 are placed near the center of each guide pin, thereby allowing the sheet-shaped connection member 21 to be supported by the two guide pins 47a, 47b. The guide-pin supporting member 57 has two guide-pin insertion grooves 571a, 571b, as shown in FIG. 45, and projecting flat plates 95a, 95b are slidably inserted from both side faces into slit holes connecting to the guide-pin insertion grooves. When the projecting flat plates are pushed after the guide pins have been placed inside the guide-pin insertion grooves, the projecting flat plates are pushed into the guide-pin insertion grooves, thereby causing the grooves to be enclosed by the projecting flat plates and thus holding the guide pins in place. The guide-pin supporting member 57 has a cavity 572 inside, and thus when the guide pins are placed, the sheet-shaped viscous connection member is positioned in the cavity, which prevents the guide-pin supporting member from contacting the connection member.

Next, both ends of the guide pins held by this guide-pin supporting member are inserted into guide-pin insertion holes 751a, 751b provided in a pair of MT ferrules 75a, 75b into which optical fibers 10a, 10b have been affixed, and then the MT ferrules are pushed in until the guide-pin supporting member 57 is contacted (FIG. 44(b)). This way, the facing MT ferrules 75a, 75b are positioned via the guide pins, so the guide-pin supporting member can be removed from the guide pins by releasing the projecting flat plates of the guide-pin supporting member (FIG. 44(c)), to butt-connect the facing MT ferrules (FIG. 44(d)). By supporting the sheet-shaped viscous connection member using the guide pins as described above, there is no possibility of the sheet-shaped viscous connection member getting damaged by the tips of the guide pins when the guide pins are inserted, and attachment of dust can also be prevented.

EXAMPLE 12

Figure 46:
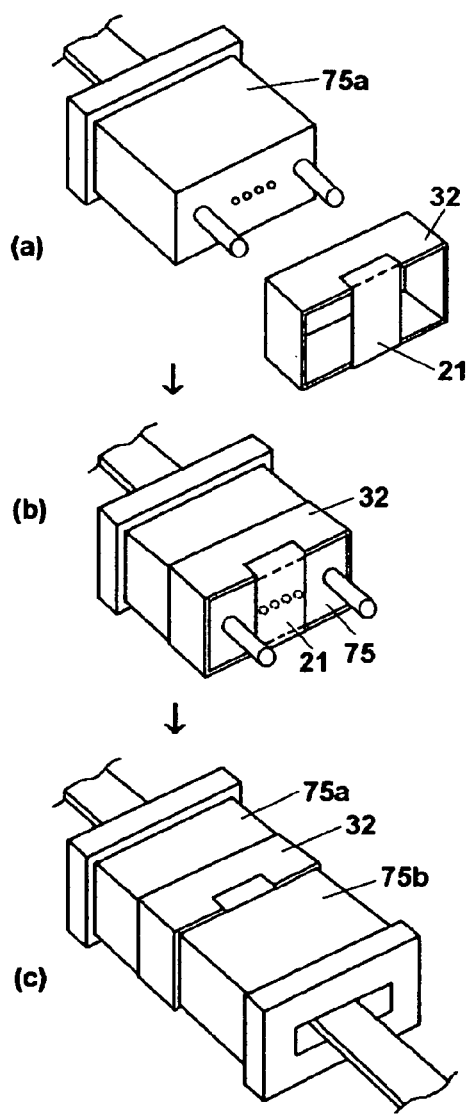
FIG. 46 is a process chart of forming the optical connection structure in Example 12.

FIGS. 46(a) through (c) are perspective views showing the components of an optical connector that applies the present invention to four-core MT ferrules, as well as their connection process. As shown in FIG. 46(a), a supporting member 32 is a tubular member having a frame-shaped cavity of roughly the same shape as the outer periphery of the MT ferrule, and a sheet-shaped viscous connection member 21 of a lateral width of 1.5 mm is placed near the center of one end of the supporting member. The other end is open, and the interior of the tubular member provides a cavity. By fitting a MT ferrule 75a in which an optical fiber is affixed into this cavity, the sheet-shaped viscous connection member 21 is placed on the end face of the MT ferrule 75a (FIG. 46(b)). Then, while the supporting member into which the ferrule has been fitted is affixed to the side faces of the ferrule, a facing MT ferrule 75b is butted to form a connector-type optical connection structure (FIG. 46(c)). By fitting the supporting member into the ferrule as explained above, the connection member can be easily installed to the MT ferrules. Also, the connection can be separated easily simply by removing the supporting member from the MT ferrules when the connection is no longer necessary.

EXAMPLE 13

To produce the optical connection structure shown in FIG. 24 above, an alignment member 42 (5 mm×12 mm×3 mm in size) having a V-shaped alignment groove 421 of a regular-triangle cross section with a length of 0.3 mm per side; two sheet-shaped top plates 81a, 81b (5 mm×5 mm×3 mm in size); optical fibers (0.25 mm in diameter) 10a, 10b that had been stripped at the tips and cut; and a viscous connection member 25 retained by a supporting member 34, were prepared. The supporting member 34 used a cylindrical pin of 0.1 mm in diameter and 3 mm in length, and the viscous connection member 25 used urethane elastomer resin whose refractive index had been adjusted to 1.46. The connection member was attached to the outer periphery of the pin by means of coating to a film thickness of approx. 0.1 mm to 0.4 mm.

To produce an optical connection structure using the above members, first the optical fibers 10a, 10b were placed in the alignment groove 421, with one optical fiber 10a positioned approx. 2 mm away from the other optical fiber 10b. Next, the supporting member 34 was placed over the alignment groove 421 in the alignment member 42 at roughly the center of the gap between the end faces of optical fibers 10a, 10b. At this time, the supporting member 34 was lightly pressed from above using a spring, so that the supporting member 34 would not easily float.

This is not shown.

Thereafter, the optical fibers 10a, 10b were moved toward the inside until they contacted the viscous connection member 25, and then moved further to achieve optical connection of the end faces of optical fibers 10a, 10b. At this time, pushing in the optical fibers 10a, 10b caused the viscous connection member 25 supported by the supporting member 34 along the optical axis to attach to the end faces of optical fibers 10a, 10b. Further pushing the optical fibers 10a, 10b caused the two optical fibers to connect with each other (refer to FIGS. 24(a) through (d)).

Based on the connection method of optical transmission media proposed by the present invention, the necessary amount of viscous connection member could be supplied to the end faces of optical fibers 10a, 10b by placing on the V-groove the supporting member 34 having the viscous connection member 25. Also, since the obtained optical connection structure was formed by placing the viscous connection member 25 from above, connection could be made without requiring complex steps, such as coating, while working on the board. In addition, the viscous connection member 25 was supplied into the alignment groove 421 by the necessary amount, which prevented contamination of the surroundings and eliminated optical transmission loss caused by axial offset due to the viscous connection member. Furthermore, work efficiency improved because the viscous connection member 25 could be removed simply by removing the supporting member 34. The connection loss was 0.3 dB or below, and no problem was found in optical characteristics.

EXAMPLE 14

Figure 47:
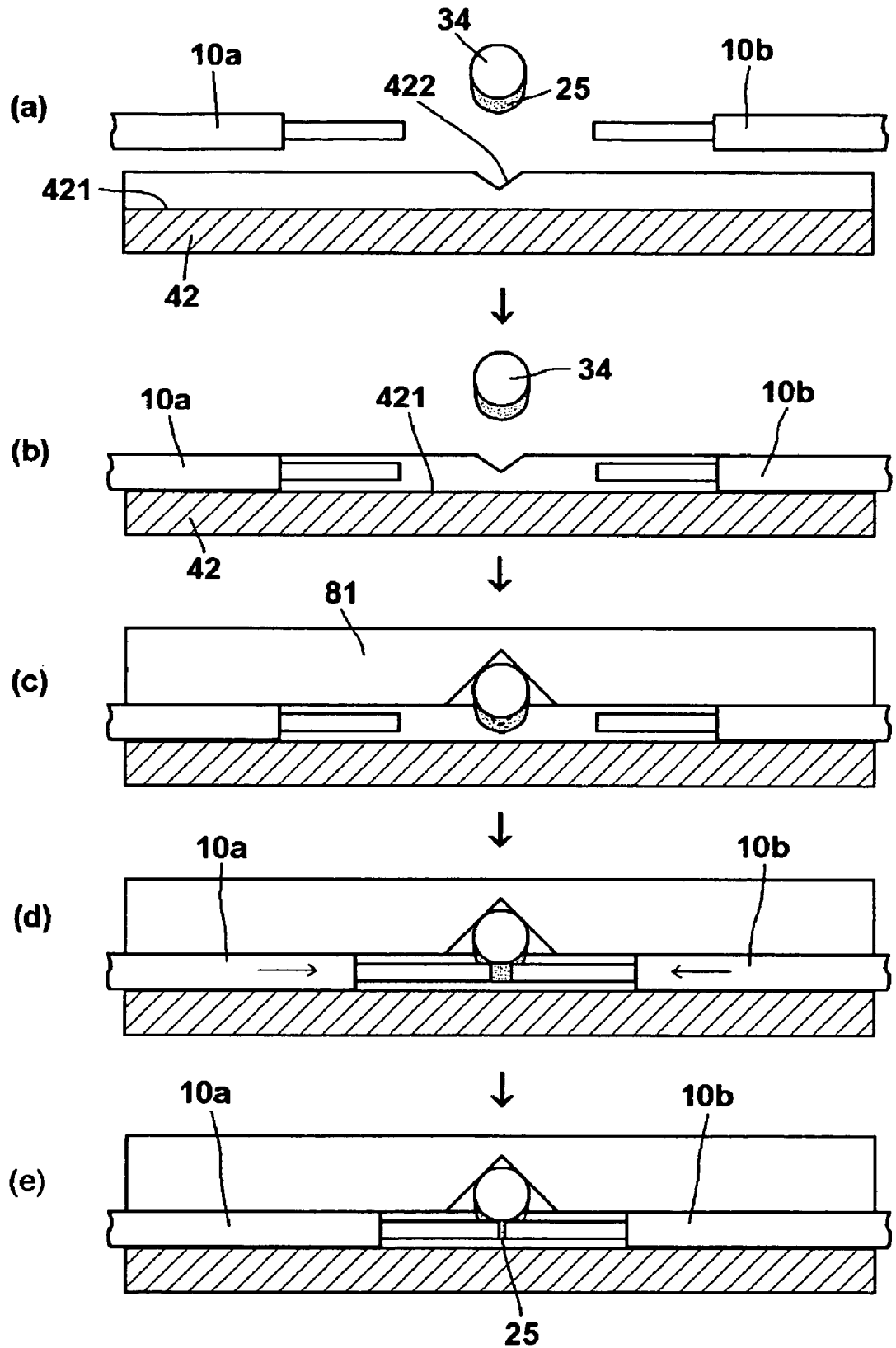
FIG. 47 is a process chart of forming the optical connection structure in Example 14 or 15.

To produce the optical connection structure shown in FIG. 47, optical connection was made using the same members described in Example 13, except that the alignment member 42 had a regular-triangle groove 422 crossing with the alignment groove 421 and having a length of 0.1 mm per side, and a retainer member 81 having a regular-triangle groove with a length of 0.2 mm per side provided in a position corresponding to the groove 422 in the alignment member 42 was used.

To produce an optical connection structure using the above members, as shown in FIGS. 47(a) and (b) first the optical fibers 10a, 10b were placed in the alignment groove 421, and then the supporting member 34 was placed in the groove 422 in the alignment member 42, just like in Example 13. Next, the retainer member 81 was placed from above so that the supporting member 34 was accommodated in the groove, as shown in FIG. 47(c), to keep the optical fibers 10a, 10b from floating.

Thereafter, the optical fibers 10a, 10b were moved and caused to contact the viscous connection member 25, as shown in FIG. 47(d). Then, the optical fibers 10a, 10b were pushed in so that the viscous connection member 25 supported by the supporting member 34 along the optical axis attached to the end faces of optical fibers 10a, 10b, after which the optical fibers 10a, 10b were pushed further as shown in FIG. 47(e) to cause them to make optical connection via the viscous connection member 25. At the same time, the supporting member 34 was moved upward to prevent it from interfering with the connection of optical fibers 10a, 10b or from damaging the end faces of optical fibers 10a, 10b.

According to the connection structure of optical transmission media shown in this example, easy positioning was achieved because the supporting member 34 could be placed readily by means of the groove 422 crossing with the alignment groove 421 in the alignment member 42. In addition, since the viscous connection member 25 could be removed simply by removing the supporting member 34, work efficiency improved. After repeated connections of 100 times, the optical fibers 10a, 10b were not damaged. The connection loss was 0.2 dB or below, and no problem was found in optical characteristics.

EXAMPLE 15

To produce the optical connection structure shown in FIG. 27, a connection member (3 mm in length) retained by a U-shaped supporting member (2 mm in width) having two cylindrical projections (3 mm in length, 0.15 mm in diameter) was prepared. Optical connection was made using the same members as described in Example 14, except that the alignment member had two holes 423a, 423b (0.15 mm in diameter, 3 mm in depth) on both sides of the alignment groove so that the projections 341a, 341b on the supporting member 34 could be inserted into these holes. The supporting member 34 was made of stainless steel. The viscous connection member 25 used in Example 14 was attached to the bottom outer periphery of the supporting member 34 by means of coating with a brush.

To produce an optical connection structure using the above members, first the optical fibers 10a, 10b were placed on both sides of the supporting member 34 above the alignment groove 421 so that their end faces faced each other, and then the projections 341a, 341b of the supporting member 34 on which the viscous connection member 25 was supported were inserted into the two holes 423a, 423b in the alignment member 42, so that the supporting member 34 was positioned above the alignment groove 421 in the alignment member 42 in a manner crossing with the alignment groove. Next, top plates (not shown) were placed over the respective optical fibers 10a, 10b to retain the optical fibers.

Thereafter, the optical fibers 10a, 10b were moved toward the inside until their tips contacted the viscous connection member 25, and then moved further to achieve optical connection of the end faces of optical fibers 10a, 10b, to form an optical connection structure conforming to the present invention (refer to FIG. 27).

According to the optical connection method described in this example, the alignment member 42 and supporting member 34 could be easily positioned and installed simply by inserting the projections 341a, 341b of the supporting member 34 into the holes 423a, 423b provided in the alignment member 42. The connection loss was 0.2 dB or below, and no problem was found in optical characteristics.

EXAMPLE 16

An optical connection structure was formed as shown in FIG. 47. To be specific, first the supporting member 34 in Example 14 was used to wrap a film-shaped viscous connection member 25 around the supporting member 34 to a width of 2 mm, as shown in FIG. 28(d). After the film was looped once, the ends of the viscous connection member were joined in a manner allowing the viscous connection member to sag by approx. 0.2 mm at the bottom of the outer periphery. Optical connection was made using the same members as described in Example 14, except that the supporting member 34 supporting the viscous connection member 25 as above was used. Also, the above film of viscous connection member was made of viscous acrylic resin (refractive index of 1.467) adjusted to a thickness of 25 μm.

When an optical connection structure was formed using the above members, the optical fibers 10a, 10b were uniformly pressured because the above film of viscous connection member 25 had a uniform thickness, and thus stable optical connection was made by keeping the optical transmission loss to 0.18 dB or below. Since the viscous connection member 25 could be removed only by peeling the film, workability also increased.

In addition, the viscous connection member 25 made of viscous resin adhered easily to the end faces of optical fibers 10a, 10b due to the wettability of the resin, and the resulting adhesive strength caused the optical fibers 10a, 10b and viscous connection member 25 to remain adhered under an appropriate pressure. Also, the flexibility of the viscous connection member 25 helped achieve optical connection through very easy handling without damaging the end faces of optical fibers 10a, 10b. Furthermore, due to the removability of the viscous connection member 25, the member could be peeled easily from the V-groove and optical fibers 10a, 10b and replaced for reconnection.

EXAMPLE 17

Figure 48:
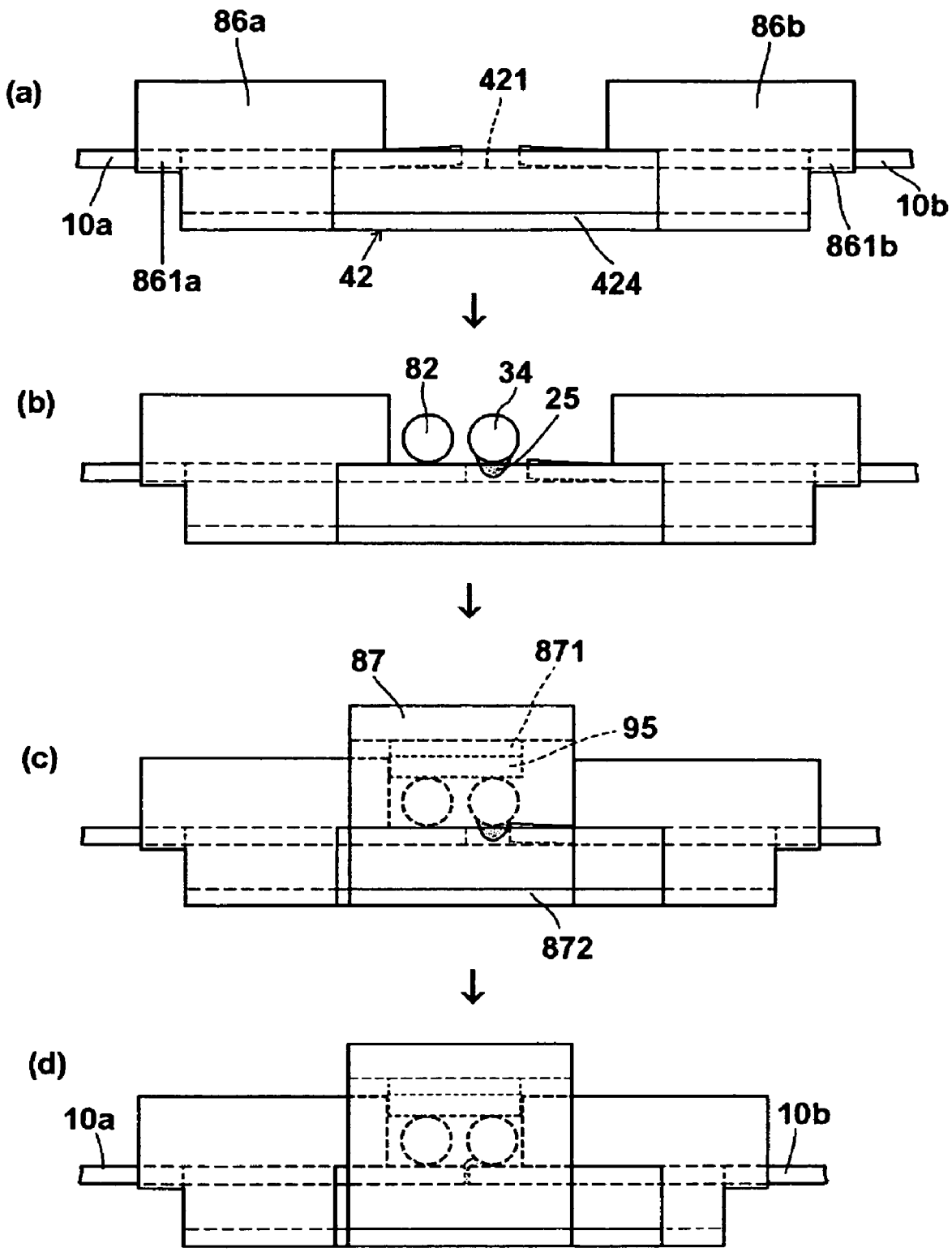
FIG. 48 is a process chart of forming the optical connection structure in Example 17.

The optical connection structure shown in FIG. 48 has optical-fiber affixing members 86a, 86b, an alignment member 42, a pin-shaped supporting member 34, a pin-shaped guide member 82, optical fibers 10a, 10b, and a pressure member 87. First, the tip of one optical fiber 10a was fitted into an affixing part 861a provided in an optical-fiber affixing member 86a and thereby retained, while the tip of the other optical fiber 10b was fitted into an affixing part 861b provided in an optical-fiber affixing member 86b and thereby retained. At this time, the end faces of optical fibers 10a, 10b were caused to project by 1.1 mm from the end faces of the affixed parts. An elastic body (viscous acrylic material) 95 was attached to a pressure projection 871 provided on the pressure member 87 for pressuring the supporting member 34 and pin-shaped guide member 82 from above.

To produce an optical connection structure using the above members, first the optical-fiber connection members 86a, 86b holding the optical fibers 10a, 10b were installed on the alignment member 42, respectively, and loosely affixed in such a way that the optical fibers 10a, 10b were placed in the alignment groove 421 in the alignment member 42. At this time, the tips of optical fibers were placed in the alignment groove 421, and the tip of optical fiber 10b was floating by approx. 0.3 mm from the alignment groove 421, as shown in FIG. 48(a).

Next, as shown in FIG. 48(b) the 1-mm diameter pin-shaped guide member 82 and supporting member 34 made of stainless steel were placed between the optical-fiber affixing members 86a, 86b on the alignment member 42. At this time, the bottom outer periphery of the supporting member 34 was coated with the connection member 25 made of viscous resin. Thereafter, as shown in FIG. 48(c), a latch 872 of the pressure member 87 was engaged with an engagement part 424 of the alignment member 42, and the pressure member 87 was pressed against the alignment member 42 from above to pressure the pin-shaped guide member 82 and supporting member 34 onto the alignment groove 421. As a result, the pin-shaped guide member 82 pressured inside the alignment groove the optical fiber 10a tip projecting from the optical-fiber affixing member 86a, while the optical fiber 10b tip projecting from the right optical-fiber affixing member 86b was floating from the alignment groove 421.

Thereafter, the right optical-fiber affixing member 86b was moved forward, as shown in FIG. 48(d). When the optical fiber 10b was moved forward, the tip of the optical fiber 10b contacted the bottom outer periphery of the supporting member 34 and was guided into the alignment groove 421 while being pressed downward by the bottom outer periphery. At this time, the viscous connection member 25 on the bottom outer periphery of the supporting member 34 contacted the end face of the optical fiber 10b, thereby causing the viscous connection member to attach to the end face of the optical fiber. Also, as the optical fiber 10b was pressed downward the two optical fibers 10a, 10b were positioned with respect to each other. When the optical fiber 10b was moved further forward, the tips of both optical fibers 10a, 10b were butted against each other and made connect, thereby producing an optical connection structure conforming to the present invention.

In the optical connection structure obtained in this example, the supporting member 34 not only had the function to support the viscous connection member 25, but it also achieved positioning of the optical fibers 10a, 10b when it was pressed downward.

The invention claimed is:

1. An optical connection structure comprising: a solid viscous connection member having a refractive-index matching property, wherein said viscous connection is a sheet-shaped viscous connection member that is adheringly disposed in a single layer state between the end faces of mutually opposing optical transmission media or between the end face of an optical transmission medium and an optical component that are mutually opposing, said viscous connection member is disposed such that the minimum value D of the distance from the center of the end face of the optical transmission medium, having a radius R and contacting said viscous connection member, to the periphery of said viscous connection member is within the range $2R \leq D \leq 60R$.

2. An optical connection structure according to claim 1, wherein the thickness of the viscous connection member disposed between the end faces of mutually opposing optical transmission media or between the end face of an optical transmission medium and an optical component that are mutually opposing is 50 μm or less.

3. An optical connection structure according to claim 1, wherein the viscosity retention distance of the viscous connection member is 10 μm or more.

4. An optical connection structure according to claim 1, wherein the viscous connection member is made of silicone resin or acrylic resin.

5. An optical connection structure according to claim 1, wherein the periphery of the sheet-shaped viscous connection member is supported by a supporting member.

6. An optical connection structure comprising: a solid viscous connection member having a refractive-index matching property, wherein said viscous connection is a sheet-shaped viscous connection member that is adheringly disposed in a single layer state between the end faces of mutually opposing optical transmission media or between the end face of an optical transmission medium and an optical component that are mutually opposing.

wherein the minimum distance $D_1$ from the center of the core of the optical transmission medium to the periphery of the viscous connection member is greater than or equal to the radius 'r' of the core of the optical transmission medium, and wherein the maximum distance $D_2$ the center of the core of the optical transmission medium to the periphery of the viscous connection member satisfies the relation $D_2 \leqq 1.5R$, where R is the radius of the optical transmission medium.

7. An optical connection structure according to claim 1, wherein, the optical transmission media are butted against each other using an alignment member.

8. An optical connection structure according to claim 1, wherein each of the optical transmission media is inserted and thus affixed in an optical-fiber alignment hole provided in a ferrule having at least one optical-fiber alignment hole or a plug containing said ferrule, and a pair of the ferrules or a pair of the plugs are butted against each other in a manner sandwiching the viscous connection member.

9. An optical connection structure according to claim 8, further comprising a member for positioning the ferrules or plugs.

10. An optical connection structure according to claim 8, wherein the ferrule or plug is installed in an adapter and the ferrules or plugs are butted against each other inside the adapter in a manner sandwiching the viscous connection member.

11. An optical connection structure according to claim 9, wherein the positioning member is a split sleeve and the ferrules or plugs are butted against each other inside said split sleeve in a manner sandwiching the viscous connection member.

12. An optical connection structure according to claim 11, wherein a supporting member that supports the viscous connection member is installed in the split sleeve.

13. An optical connection structure according to claim 9, wherein the positioning member is a guide pin, the ferrule or plug has a guide pin hole, and the ferrules or plugs are positioned by inserting the guide pin into the facing guide pin holes.

14. An optical connection structure according to claim 8, further comprising a supporting member that supports the viscous connection member, wherein said supporting member is a tubular member,
wherein the viscous connection member is supported on one end of said tubular member while the other end is fitted into the ferrule to achieve optical connection.

15. An optical connection structure according to claim 1, having at least one pair of optical transmission media, an alignment member with an alignment groove, a solid viscous connection member having a refractive-index matching property and able to freely change its shape, and a supporting member that supports the viscous connection member; said optical connection structure characterized in that the end faces of the at least one pair of optical transmission media are opposingly placed inside the alignment groove in the alignment member, the supporting member is placed above the alignment groove between the optical transmission media, and the at least one pair of optical transmission media are optically connected in a manner sandwiching the viscous connection member,
wherein the solid viscous connection member is adheringly disposed in a single layer structure.

16. An optical connection structure according to claim 15, wherein the alignment member has a groove in the direction crossing with the alignment groove and the supporting member is placed in said groove.

17. An optical connection structure according to claim 16, wherein the supporting member has at least one projection, the alignment member has at least one hole, and the projection of the supporting member is inserted and thus affixed into said hole to place the supporting member on the alignment groove.

18. An optical connection structure according to claim 6, wherein the viscosity retention distance of the viscous connection member is 10 μm or more.

19. An optical connection structure according to claim 10, further comprising a supporting member that supports the viscous connection member, wherein said supporting member is a tubular member,
wherein the viscous connection member is supported on one end of said tubular member while the other end is fitted into the ferrule or adapter to achieve optical connection.

20. An optical connection structure according to claim 6, wherein the thickness of the viscous connection member disposed between the end faces of mutually opposing optical transmission media or between the end face of an optical transmission medium and an optical component that are mutually opposing is 50 μm or less.

* * * * *

UNITED STATES PATENT AND TRADEMARK OFFICE
CERTIFICATE OF CORRECTION

PATENT NO. : 7,422,375 B2
APPLICATION NO. : 10/579459
DATED : September 9, 2008
INVENTOR(S) : Masayoshi Suzuki, Kyoichi Sasaki and Tatsushi Kobayashi It is certified that error appears in the above-identified patent and that said Letters Patent is hereby corrected as shown below:

In Column 7 at line 3, change "bisphnol," to --bisphenol,--.

In Column 27 at line 56, in Example 4, change "mflends" to --mf Lens--.

In Column 36 at line 60, in Claim 6, change "opposing." to --opposing,--.

In Column 36 at line 66, in Claim 6, change "$D_2$ the" to --$D_2$ from the--.

Signed and Sealed this

Fourteenth Day of April, 2009

JOHN DOLL
*Acting Director of the United States Patent and Trademark Office*